(12) United States Patent
Resch et al.

(10) Patent No.: US 9,229,823 B2
(45) Date of Patent: Jan. 5, 2016

(54) STORAGE AND RETRIEVAL OF DISPERSED STORAGE NETWORK ACCESS INFORMATION

(75) Inventors: Jason K. Resch, Chicago, IL (US); S. Christopher Gladwin, Chicago, IL (US); Andrew Baptist, Chicago, IL (US); Thomas Franklin Shirley, Jr., Wauwatosa, WI (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 13/587,277

(22) Filed: Aug. 16, 2012

(65) Prior Publication Data

US 2013/0046992 A1 Feb. 21, 2013

Related U.S. Application Data

(60) Provisional application No. 61/524,521, filed on Aug. 17, 2011.

(51) Int. Cl.

| | |
|---|---|
| *H04L 9/28* | (2006.01) |
| *G06F 11/16* | (2006.01) |
| *H04L 9/32* | (2006.01) |
| *H04L 9/08* | (2006.01) |

(Continued)

(52) U.S. Cl.
CPC ............. *G06F 11/1612* (2013.01); *G06F 3/06* (2013.01); *G06F 3/0604* (2013.01); *G06F 3/067* (2013.01); *G06F 11/00* (2013.01); *G06F 15/17331* (2013.01); *H04L 9/085* (2013.01); *H04L 9/0863* (2013.01); *H04L 9/0869* (2013.01); *H04L 9/0894* (2013.01); *H04L 9/32* (2013.01); *H04L 9/321* (2013.01); *H04L 9/3263* (2013.01); *G06F 11/1446* (2013.01); *G06F 21/00* (2013.01); *G06F 2211/1028* (2013.01); *H04L 9/00* (2013.01); *H04L 29/06* (2013.01); *H04L 2209/16* (2013.01)

(58) Field of Classification Search
CPC .................................. G06F 11/16; H04L 9/08
See application file for complete search history.

(56) References Cited

U.S. PATENT DOCUMENTS

| | | | |
|---|---|---|---|
| 4,092,732 A | 5/1978 | Ouchi | |
| 5,263,085 A * | 11/1993 | Shamir | ........................... 380/30 |

(Continued)

OTHER PUBLICATIONS

Adi Shamir, "How to share a secret", 1979, pp. 612-613.*

(Continued)

*Primary Examiner* — William Goodchild
*Assistant Examiner* — Wasika Nipa
(74) *Attorney, Agent, or Firm* — Garlick & Markison; Timothy W. Markison

(57) ABSTRACT

A method begins by a dispersed storage (DS) processing module receiving a certificate signing request (CSR) from a user device. The method continues with the DS processing module generating a set of hidden passwords based on the CSR and accessing a set of authenticating units to obtain a set of passkeys. The method continues with the DS processing module retrieving a set of encrypted shares and decrypting the set of encrypted shares to produce a set of encoded shares. The method continues with the DS processing module decoding the set of encoded shares to recapture a private key and generating a user signed certificate based on the private key. The method continues with the DS processing module discarding the private key to substantially protect the private key from the user device and outputting the user signed certificate to the user device.

12 Claims, 24 Drawing Sheets

(51) Int. Cl.

| | | |
|---|---|---|
| *G06F 3/06* | (2006.01) | |
| *G06F 11/00* | (2006.01) | |
| *G06F 15/173* | (2006.01) | |
| *H04L 29/06* | (2006.01) | |
| *G06F 21/00* | (2013.01) | |
| *H04L 9/00* | (2006.01) | |
| *G06F 11/14* | (2006.01) | |

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A * | 11/1999 | Garay et al. .............. 713/165 |
| 6,012,159 A | 1/2000 | Fischer et al. |
| 6,058,454 A | 5/2000 | Gerlach et al. |
| 6,088,454 A * | 7/2000 | Nagashima et al. ........ 380/286 |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,550,009 B1 * | 4/2003 | Uranaka et al. ............ 713/168 |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,132,073 B1 * | 3/2012 | Bowers et al. ............. 714/755 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 * | 2/2003 | Meffert et al. ............. 713/201 |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0037728 A1 * | 2/2009 | Kamikura .................. 713/156 |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0180116 A1 * | 7/2010 | Coan et al. ................ 713/168 |
| 2010/0235638 A1 * | 9/2010 | Irvine ....................... 713/168 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner computing system 10

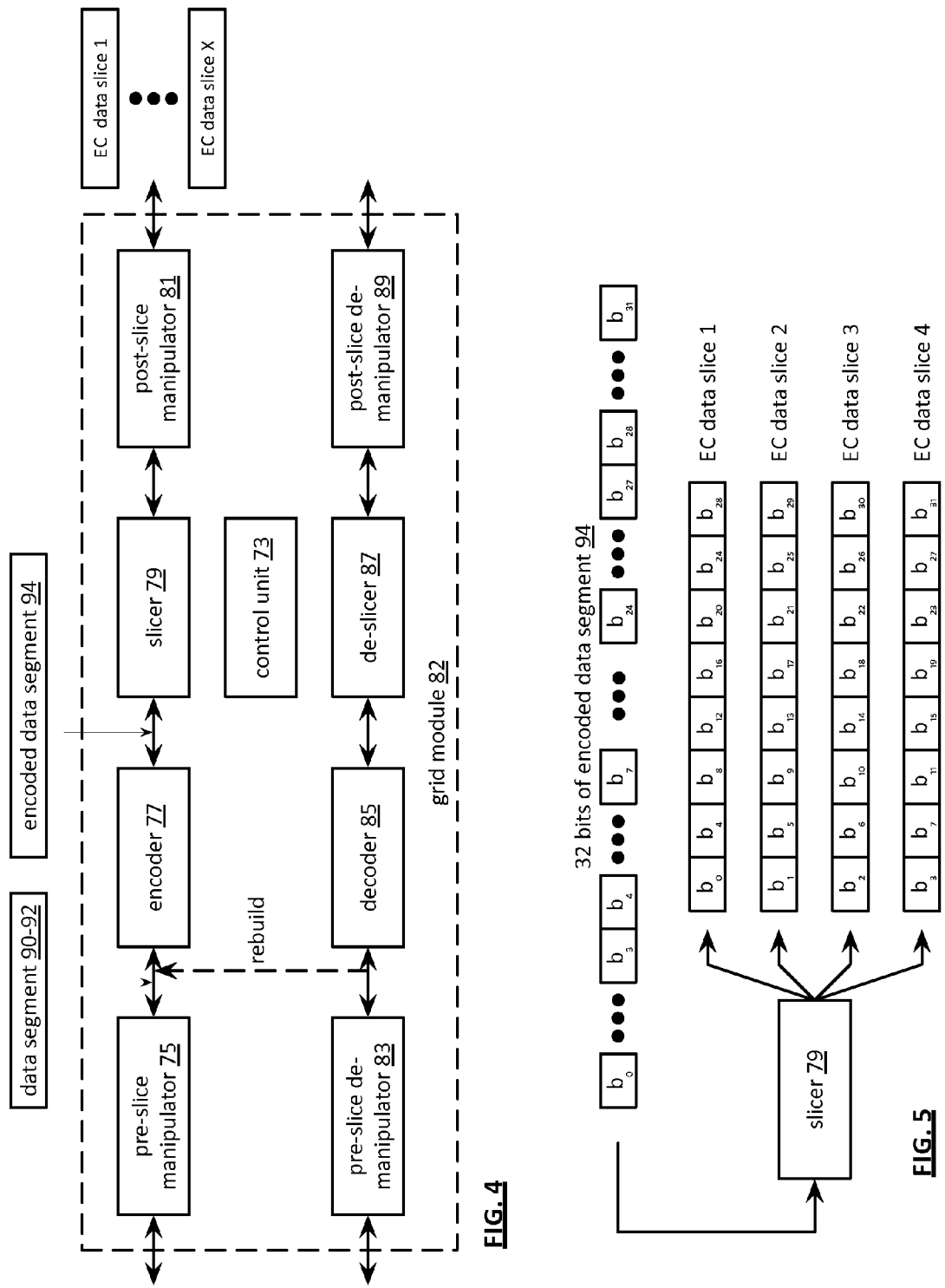

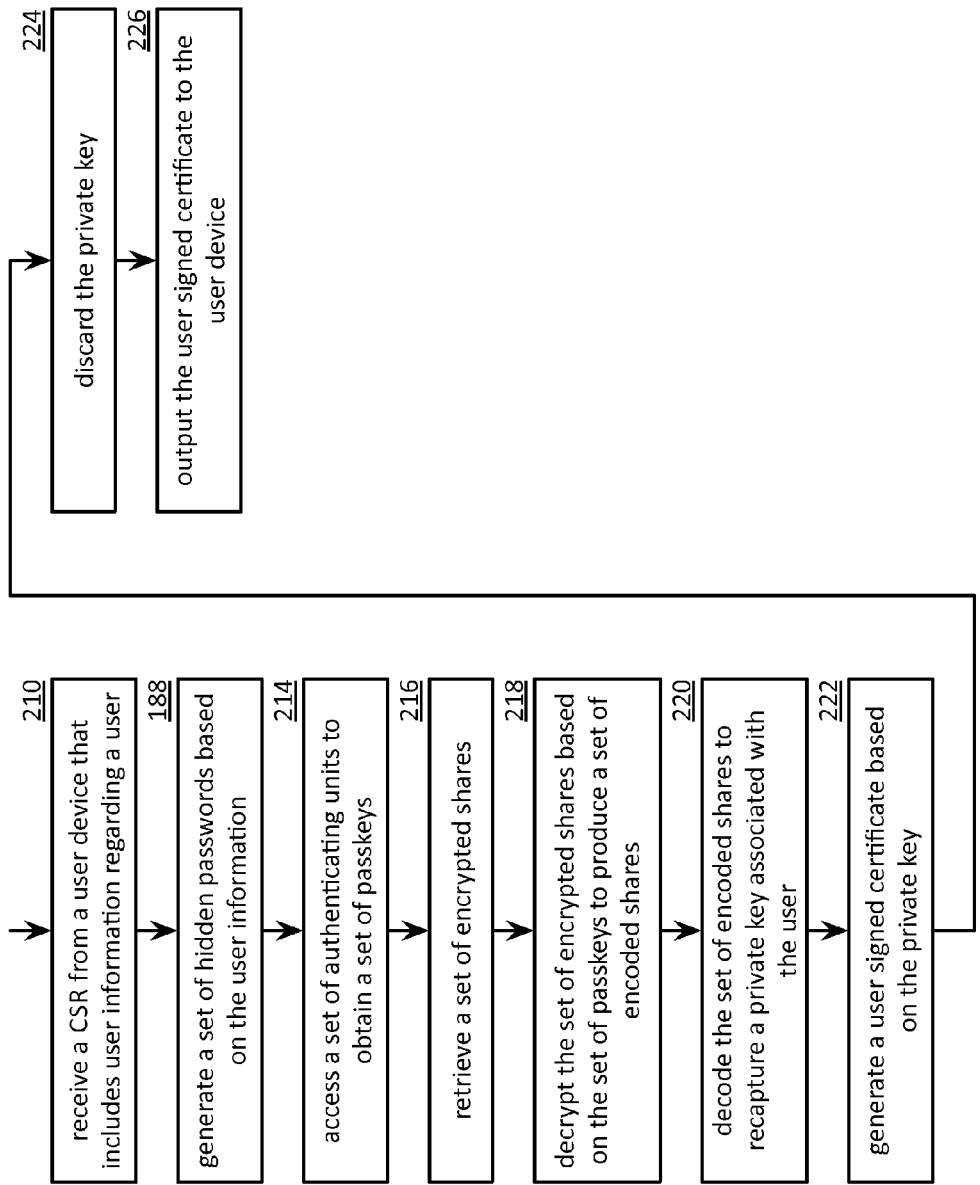

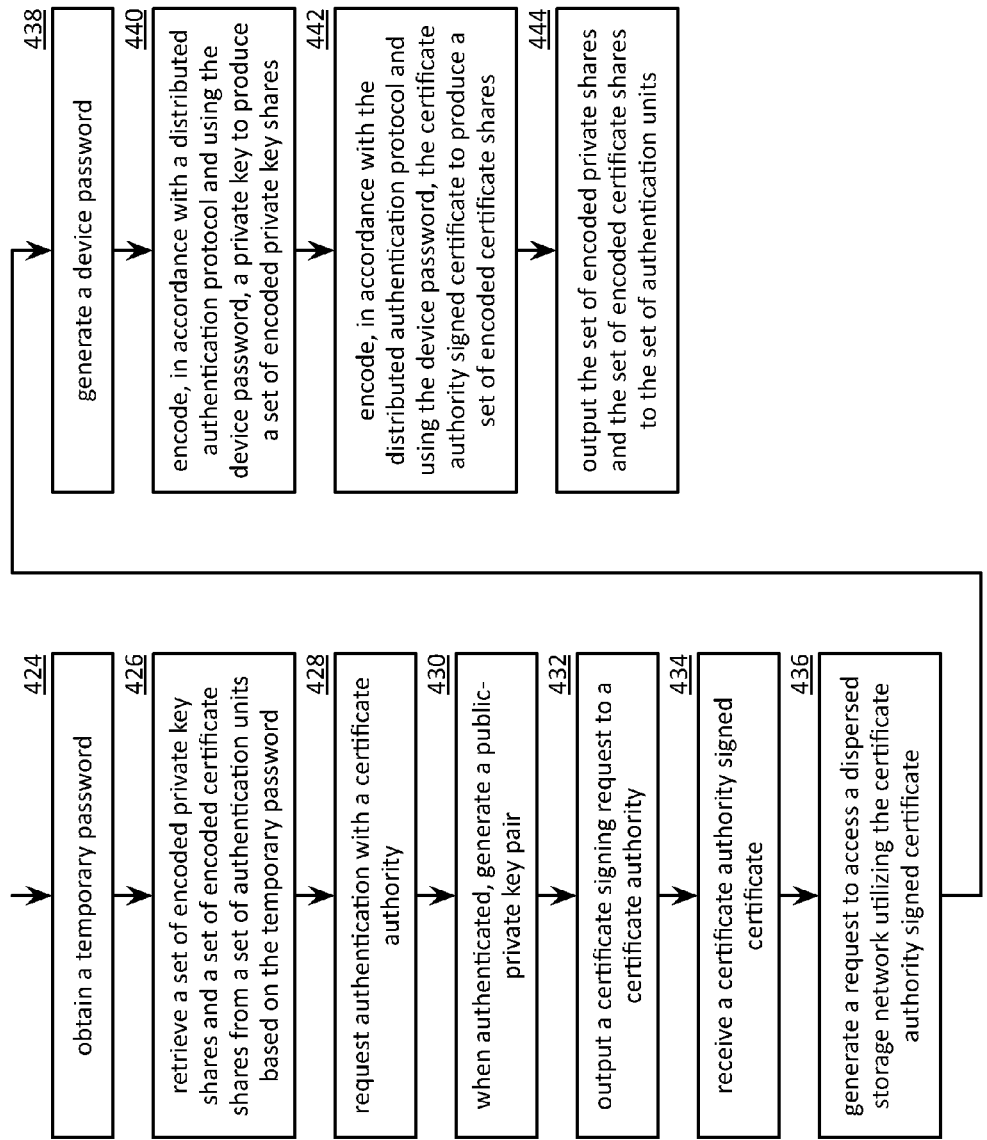

STORAGE AND RETRIEVAL OF DISPERSED STORAGE NETWORK ACCESS INFORMATION

CROSS REFERENCE TO RELATED PATENTS

The present U.S. Utility patent application claims priority pursuant to 35 U.S.C. §119(e) to U.S. Provisional Application No. 61/524,521, entitled "Distributed Authentication Token Device," filed Aug. 17, 2011, pending, which is incorporated herein by reference in its entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to computing systems and more particularly to data storage solutions within such computing systems.

2. Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to use a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 4 is a schematic block diagram of an embodiment of a grid module in accordance with the present invention;

FIG. 5 is a diagram of an example embodiment of error coded data slice creation in accordance with the present invention;

FIG. 9 is a flowchart illustrating an example of retrieving access information in accordance with the present invention;

FIG. 16D is a flowchart illustrating an example of acquiring access credentials in accordance with the present invention;

DETAILED DESCRIPTION OF THE INVENTION

Figure 1:
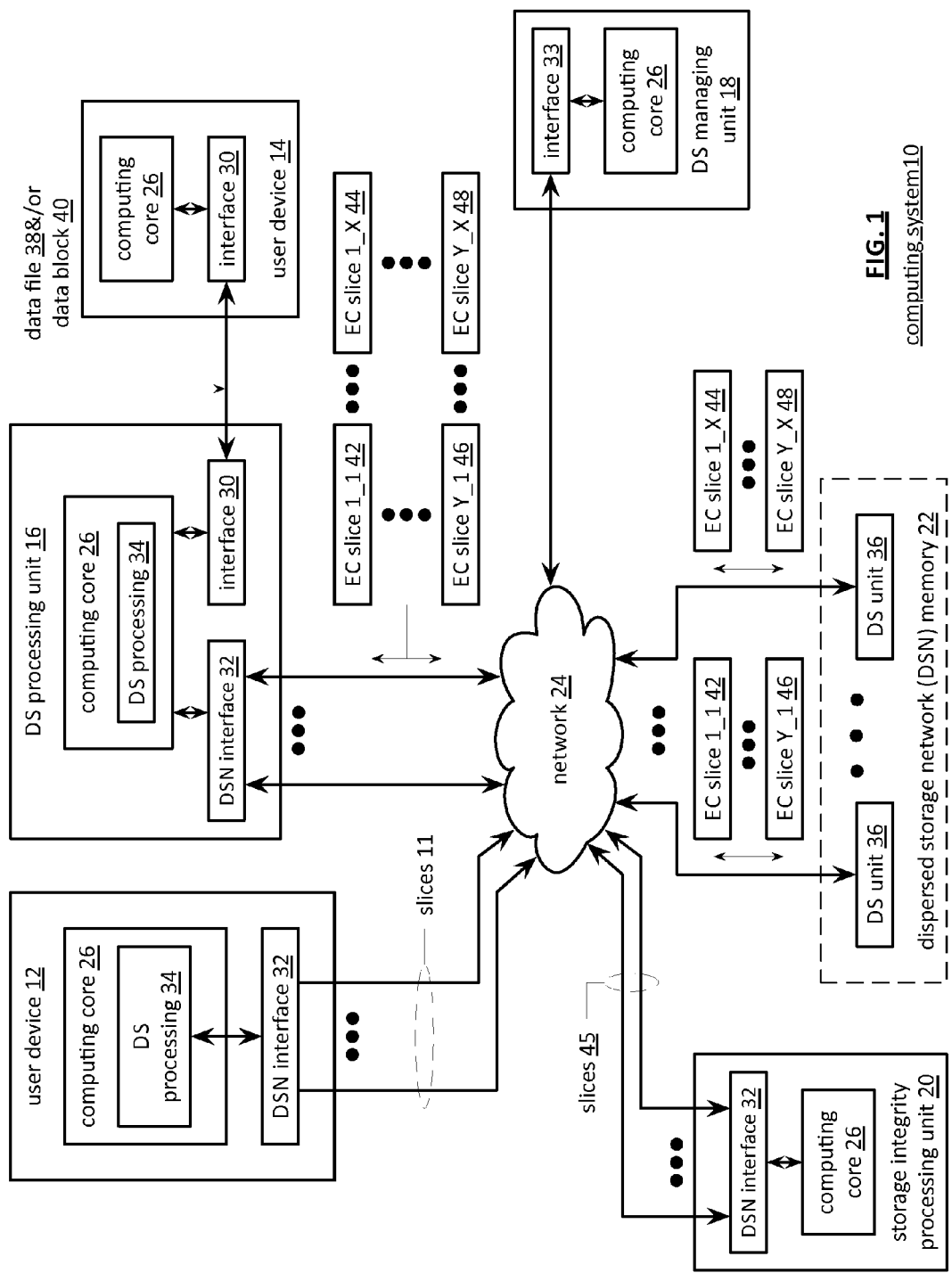
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 indirectly and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing module 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuild slice, or slices, in the appropriate DS unit(s) 36 in a manner that mimics the write process previously described.

Figure 2:
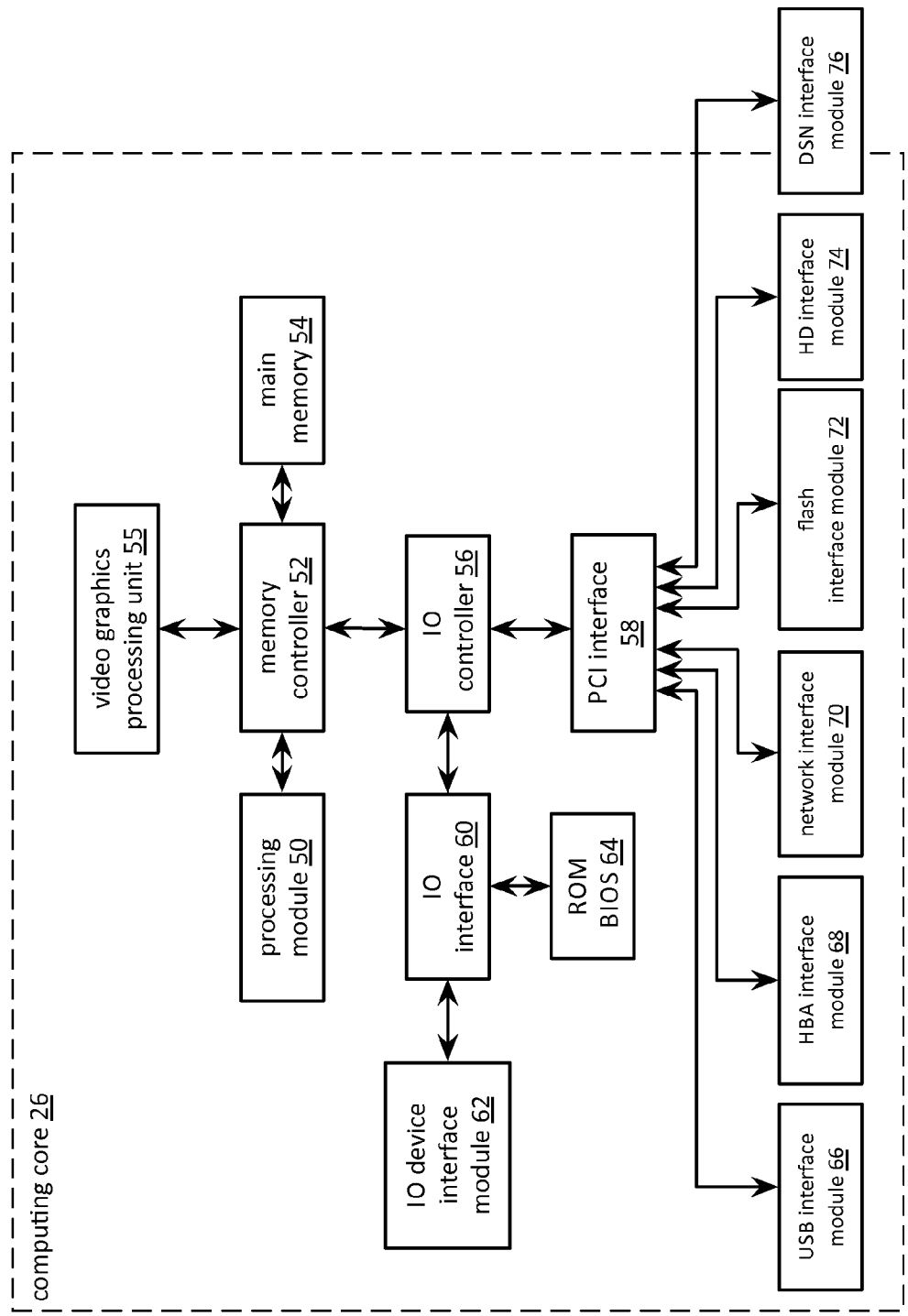
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
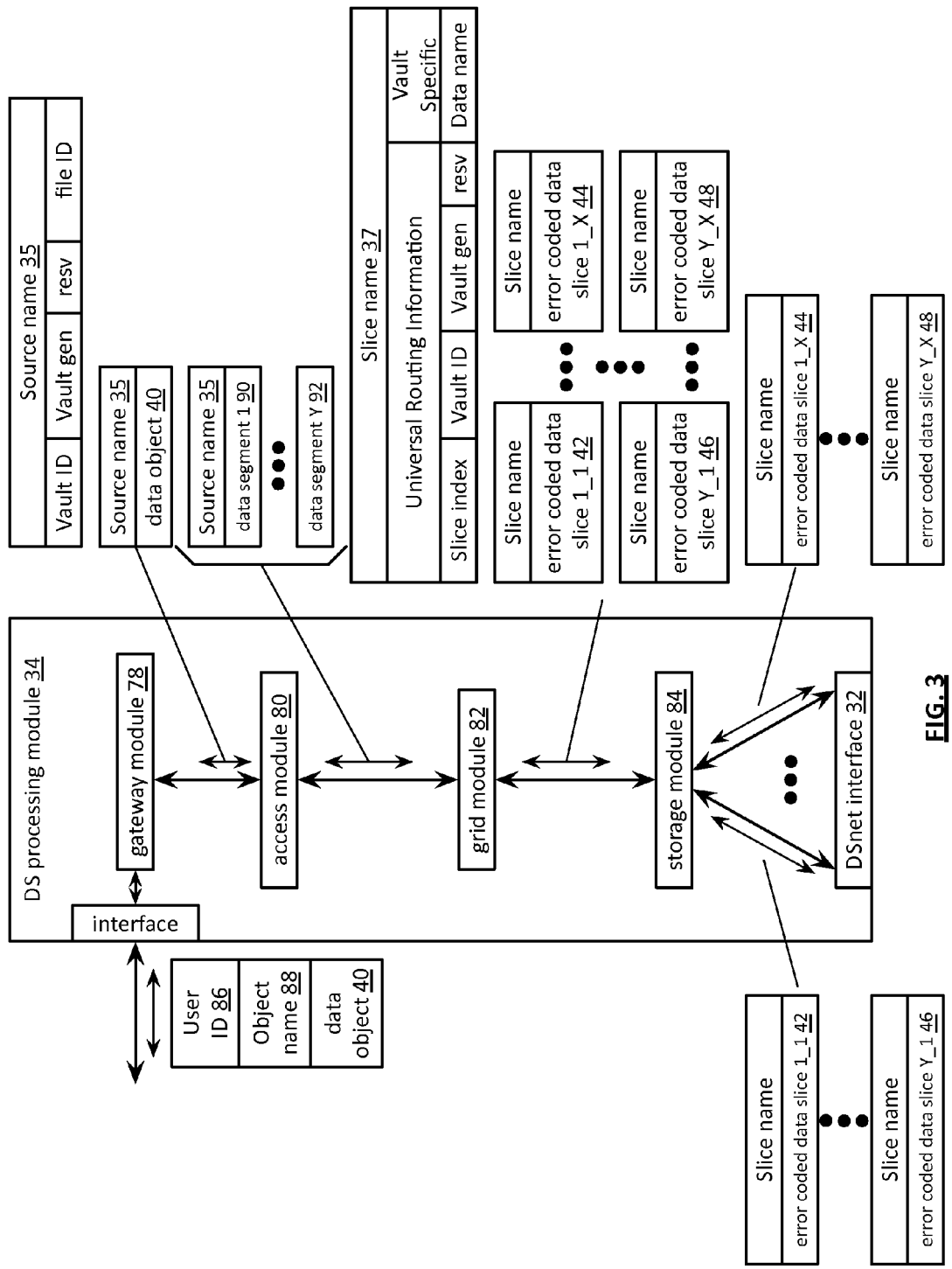
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X−T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, bytes, data words, etc., but may include more or less bits, bytes, data words, etc. The slicer 79 disperses the bits of the encoded data segment 94 across the EC data slices in a pattern as shown. As such, each EC data slice does not include consecutive bits, bytes, data words, etc. of the data segment 94 reducing the impact of consecutive bit, byte, data word, etc. failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
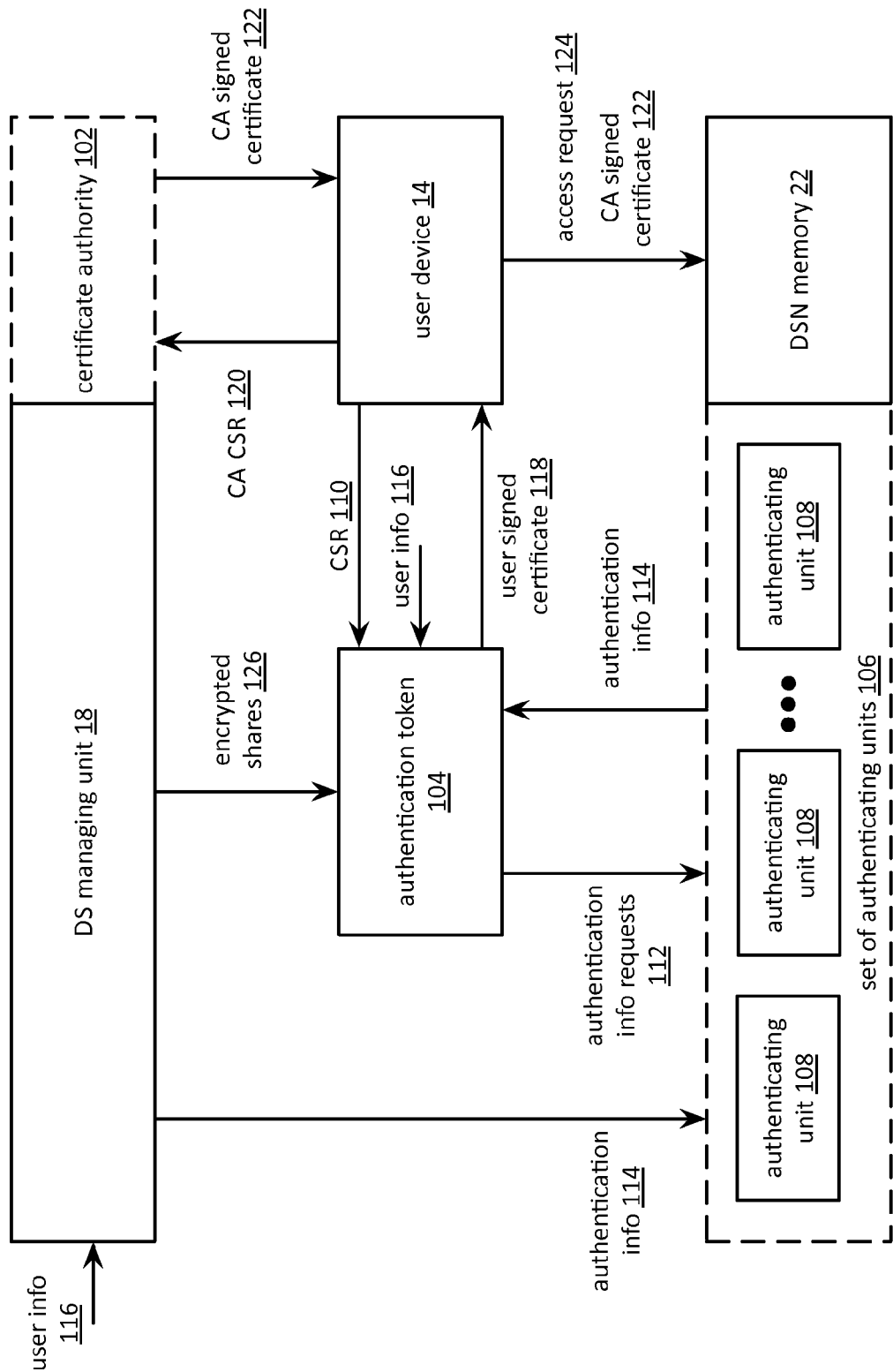
FIG. 6A is a schematic block diagram of an embodiment of an access information storage and retrieval system in accordance with the present invention.

FIG. 6A is a schematic block diagram of an embodiment of an access information storage and retrieval system that includes a dispersed storage (DS) managing unit 18 (e.g., a managing unit), a certificate authority (CA) 102, a user device 14, an authentication token 104, a set of authenticating units 106, and a dispersed storage network memory 22. The certificate authority 102 may be implemented as part of the DS managing unit 18. The set of authenticating units 106 includes a set number of authenticating units 108. An authenticating unit 108 may be implemented as a DS unit. The set of authenticating units 106 may be implemented as part of the DSN memory 22 when an authenticating unit 108 is implemented as a DS unit.

The system functions to store access information in the authentication token 104 and the set of authenticating units 106 for subsequent retrieval and processing by the authentication token 104 to enable user device 14 to access the DSN memory 22. With regards to retrieval of the access information to enable access to DSN number 22, the user device 14 generates a certificate signing request (CSR) 110 and sends the CSR 110 to the authentication token 104 when the user device 14 desires to gain access to the DSN memory 22. Next, the authentication token 104 sends authentication information requests 112 (e.g., blinded passwords) to the set of authentication units 106 and receives authentication information 114 (e.g., passkeys, retrieved random numbers) in response. For example, the authentication token 104 generates a set of random numbers, obtains user information 116 (e.g., a password), generates a set of blinded passwords based on the set of random numbers and the user information 114, and outputs the set of blinded passwords to the set of authenticating units 106.

The authentication token 104 retrieves encrypted shares 126 from a memory of the authentication token 104. The authentication token 104 decrypts the encrypted shares 126 based on the authentication information 114 and the user information 116 to produce encoded shares. For example, the authentication token 104 generates a set of encryption keys based on a set of passkeys of the authentication information 114 and the set of random numbers. The authentication token 104 generates a user signed certificate 118 based on the CSR 110 and the encoded shares. For example, the authentication token 104 decodes the encoded shares to produce a private key affiliated with the user device and generates a certification signature for a certificate of CSR 110 to produce the user signed certificate 118. The user device 14 generates a CSR with the user signed certificate 118 to produce a CA CSR 120. The user device 14 sends the CA CSR 120 to the certificate authority 102 and receives a CA signed certificate 122 in response. The user device 14 generates an access request 124 and sends the access request 124 and the CA signed certificate 122 to DSN memory 22 to gain access to the DSN memory 22. The method of operation of the authentication token 104 to retrieve and utilize the access information is discussed in greater detail with reference to FIGS. 8 and 9.

With regards to storage of the access information, the DS managing unit 18 generates the encrypted shares 126 based on the user information 116. For example, the DS managing unit 18 generates and encodes the private key affiliated with user device 14, applies a share encoding function on the private key to produce a set of encoded shares, generates a set of random numbers, generates a set of hidden passwords based on the user information 116, generates a set of encryption keys based on the set of hidden passwords and the set of random numbers, and encrypts the set of encoded shares utilizing a set of encryption keys to produce a set of encrypted shares 126. The DS managing unit 18 outputs the encrypted shares 126 to the authentication token 104 for storage therein. The DS managing unit 18 outputs the set of random numbers as authentication information 114 to the set of authenticating units 106 for storage therein. The method of operation of the DS managing unit 18 to generate and store the access information is discussed in greater detail with reference to FIGS. 6B, 7A, and 7B.

Figure 6B:
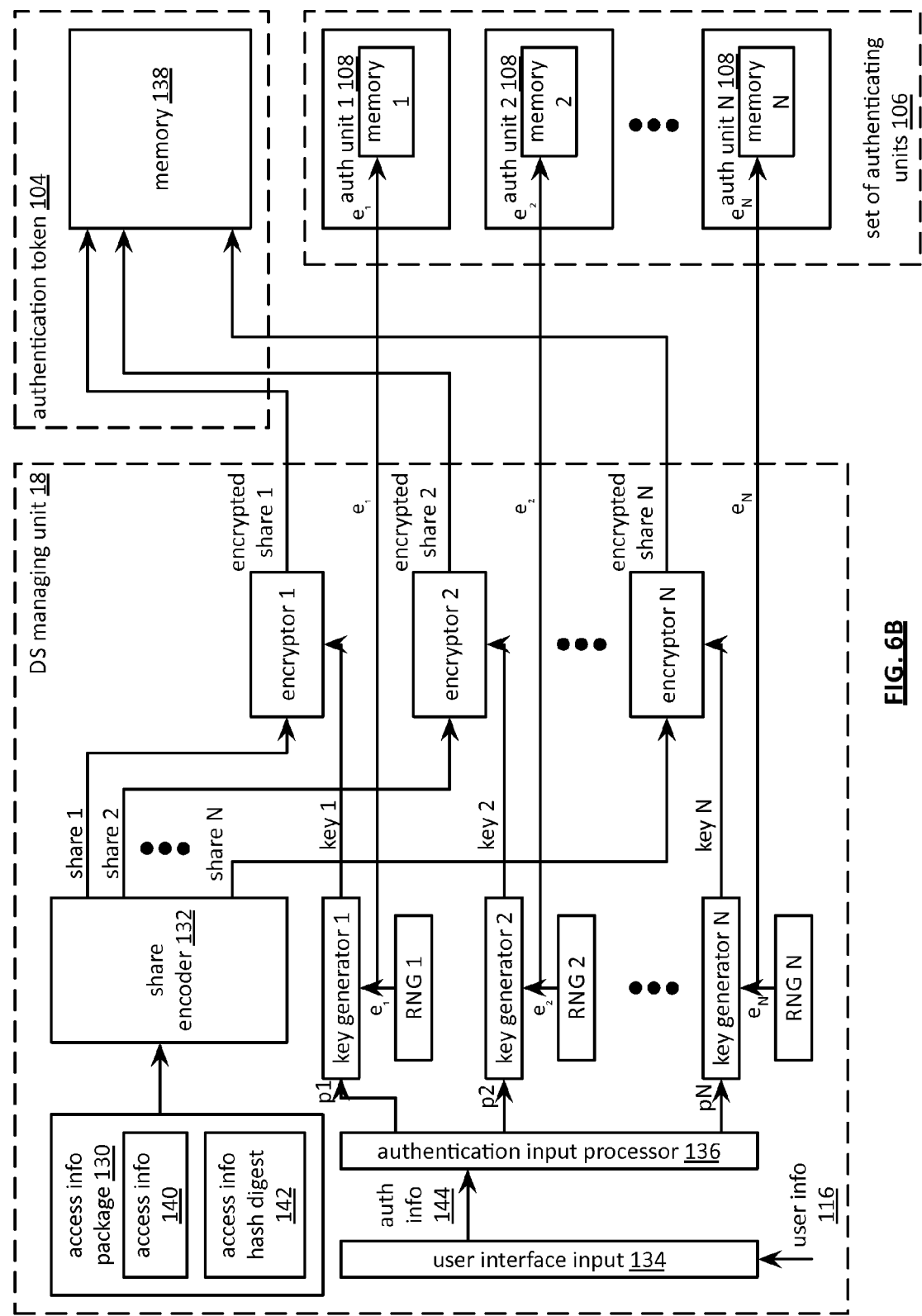
FIG. 6B is a schematic block diagram of an embodiment of an access information storage system in accordance with the present invention.

FIG. 6B is a schematic block diagram of an embodiment of an access information storage system that includes a dispersed storage (DS) managing unit 18, an authentication token 104, and a set of authenticating units 106. The set of authenticating units 106 includes authenticating units 1-N 106 where N is just a set number. The authentication token 104 includes a memory 138. Each authenticating unit includes a memory of a set of memories 1-N. At least one authenticating unit 108 of the set of authenticating units 106 may be implemented utilizing at least one of a DS processing unit, a DS unit, and a dispersed storage network (DSN) memory.

The DS managing unit 18 includes an access information package 130, a share encoder 132, a set of random number generators (RNG) 1-N, a set of key generators 1-N, an authentication input processor 136, a user interface input 134, and a set of encryptors 1-N. The access information package 130 includes access information 140 and an access information hash digest 142. The access information hash digest 142 may be generated by utilizing a deterministic function (e.g., a hashing function) on the access information 140. The access information hash digest 142 may be utilized in a subsequent integrity verification step to verify that the access information 140 has not been tampered with.

The access information 140 may include one or more of a private key of a public/private key pairing associated with a user device, a user device identifier (ID), a communications path identifier, a wireless channel identifier, a communications system talkgroup identifier, an encryption key, a public key, a public/private key pair, a credential, a signature, a signed certificate, a certificate chain, access permissions, authentication information, and access privileges. The access information 140 may be utilized by a user device to gain access to a system (e.g., a dispersed storage network (DSN), an information system, a data storage system, a communication system, a control system, etc.). Gaining access may include one or more of establishing a connection, authenticating (e.g., utilizing a certificate authority signed certificate and/or a user device signed certificate), obtaining registry information, receiving content from the system, sending content to the system, deleting content from the system, receiving a communication, and sending a communication. For example, a first wireless user device utilizes a signed certificate generated utilizing a private key of the access information 140 to gain access to DSN via a wireless communication network.

The share encoder 132 encodes the access information package 130 in accordance with a share encoding function to produce a set of encoded shares 1-N. The share encoding function includes at least one of a dispersed storage error encoding function and a secret sharing function (e.g., a Shamir secret sharing algorithm). The set of encryptors 1-N encrypt the set of encoded shares 1-N in accordance with an encryption algorithm utilizing a set of keys 1-N to produce a set of encrypted shares 1-N. The encryption algorithm may be in accordance with dispersed storage error coding parameters. For example, each encryptor of the set of encryptors 1-N utilizes a common encryption algorithm in accordance with the dispersed storage error coding parameters. As another example, at least two encryptors of the set of encryptors 1-N utilize different encryption algorithms in accordance with the dispersed storage error coding parameters.

The set of encryptors 1-N output the set of encrypted shares 1-N to memory 138 for storage therein. Alternatively, the set of encryptors 1-N output the set of encrypted shares 1-N to at least one DS processing unit, wherein the DS processing unit dispersed storage error encodes each encrypted share of the set of encrypted shares 1-N to produce at least one plurality of sets of encrypted share slices and stores the at least one plurality of sets of encrypted share slices in a DSN memory. Alternatively, the set of encryptors 1-N output the set of encrypted shares 1-N to at least one DSN memory for storage therein (e.g., without producing the at least one plurality of sets of encrypted share slices).

The user interface input 134 directly receives user information 116 (e.g., from a user via a keypad) to produce authentication information 144 or indirectly receives the authentication information 144 from a user device (e.g., via retrieving and/or receiving). The authentication information 144 includes one or more of a text string, at least one of a user device identifier (ID), a user ID, a personal information number (PIN), a badge ID, a district ID, a work-shift ID, an assignment ID, a mission ID, a passcode, a password, a picture file, a video file, an audio file, a retinal scan, a facial scan, a fingerprint scan, a personal secret, a password index number, and any other values that can be subsequently provided by a user of a user device. For example, the user interface input 134 directly receives a password and a PIN from a keyboard input as the authentication information 144. As another example, the user interface input 134 indirectly receives the password and the PIN as the authentication information 144 by receiving the password and the PIN from a user registration server, wherein the password and the PIN were subsequently generated when an associated user was added to a registration database within the registration server.

The user interface input 134 outputs the authentication information 144 to the authentication input processor 136. The authentication input processor 136 generates a plurality of hidden passwords p1-pN based on the authentication information 144. The generating of the plurality of hidden passwords p1-pN includes transforming the authentication information 144 in accordance with a set of transformation functions to produce a set of transformed personalized authenticating values and for each password of the corresponding plurality of hidden passwords, combining, in accordance with a combining function, one of the set of transformed personalized authenticating values with at least one of a constant and another one of the set of transformed personalized authenticating values to produce the password. In an instance, each hidden password is unique from all the other hidden passwords. In another instance, each hidden password is substantially the same as all the other hidden passwords.

For example, the authentication input processor 136 receives authentication information 144 from a fingerprint reader user interface input 134 and calculates a hash to produce a first intermediate result. Next, the authentication input processor 136 receives authentication information as a PIN from a keypad and adds the PIN to the first intermediate result to produce a hidden password core. The authentication input processor 136 partitions the hidden password core to produce the hidden passwords p1-pN. Alternatively, the authentication input processor 136 replicates the hidden password core to produce the hidden passwords p1-pN.

The set of random number generators 1-N generate a set of random numbers $e_1$-$e_N$. For example, each random number of the set of random numbers $e_1$-$e_N$ are a same number of bits as a number of bits of p, where p is determined by security parameters (e.g., of dispersed storage error coding parameters). The set of random number generators 1-N output the set of random numbers $e_1$-$e_N$ to the set of authenticating units 106 for storage therein. Alternatively, a DS processing module or DS processing unit associated with each authenticating unit 108 or with the DS managing unit 18 dispersed storage error encodes each random number of the set of random numbers $e_1$-$e_N$ in accordance with the dispersed storage error coding parameters to produce N pluralities of sets of encoded random number slices. Next, the DS processing module sends the corresponding plurality of encoded random number slices to a DSN memory for storage therein.

The set of key generators 1-N generates a set of keys 1-N based on one or more of the set of random numbers $e_1$-$e_N$, security parameters, and the set of hidden passwords p1-pN. Each key of the set of keys 1-N includes a same number of bits as a number of bits of p. For example, the set of key generators 1-N generate the set of keys 1-N by transforming an expansion of the set of hidden password p1-pN utilizing a mask generating function (MGF) and the set of random numbers $e_1$-$e_N$ in accordance with the expression: key $x=((MGF(px))^2)^{e_x}$ modulo p. For example, key $1=((MGF(p1))^2)^{e_1}$ modulo p. In an instance, key generator 1 calculates key $1=13$ when $MGF(p1)=4$, $e_1=10$, and $p=23$, since $(4^2)^{10}$ mod $23=13$. Alternatively, or in addition to, one of the key generators may process the key to provide a key of a desired length in relation to an encryption algorithm. For example, the key output of the algorithm is hashed to produce a hashed key and a desired number of bits (e.g., 256, 192, 128 bits) of the hashed key are utilized as a key for the encryption algorithm.

The user information 116 (e.g., same password), a decode threshold number of pairs of random numbers $e_x$ and encrypted shares x are required to subsequently reproduce the access information package 130. The method to reproduce the access information package 130 is discussed in greater detail with reference to FIGS. 8 and 9. Note that a security improvement is provided by the system when the pairs of random numbers $e_x$ and encrypted shares x are stored at substantially different storage locations (e.g., in the authentication token 104 and in the set of authenticating units 106) by reducing the likelihood of a successful attack to gain access to the pairs of random numbers $e_x$ and encrypted shares x.

Figure 7A:
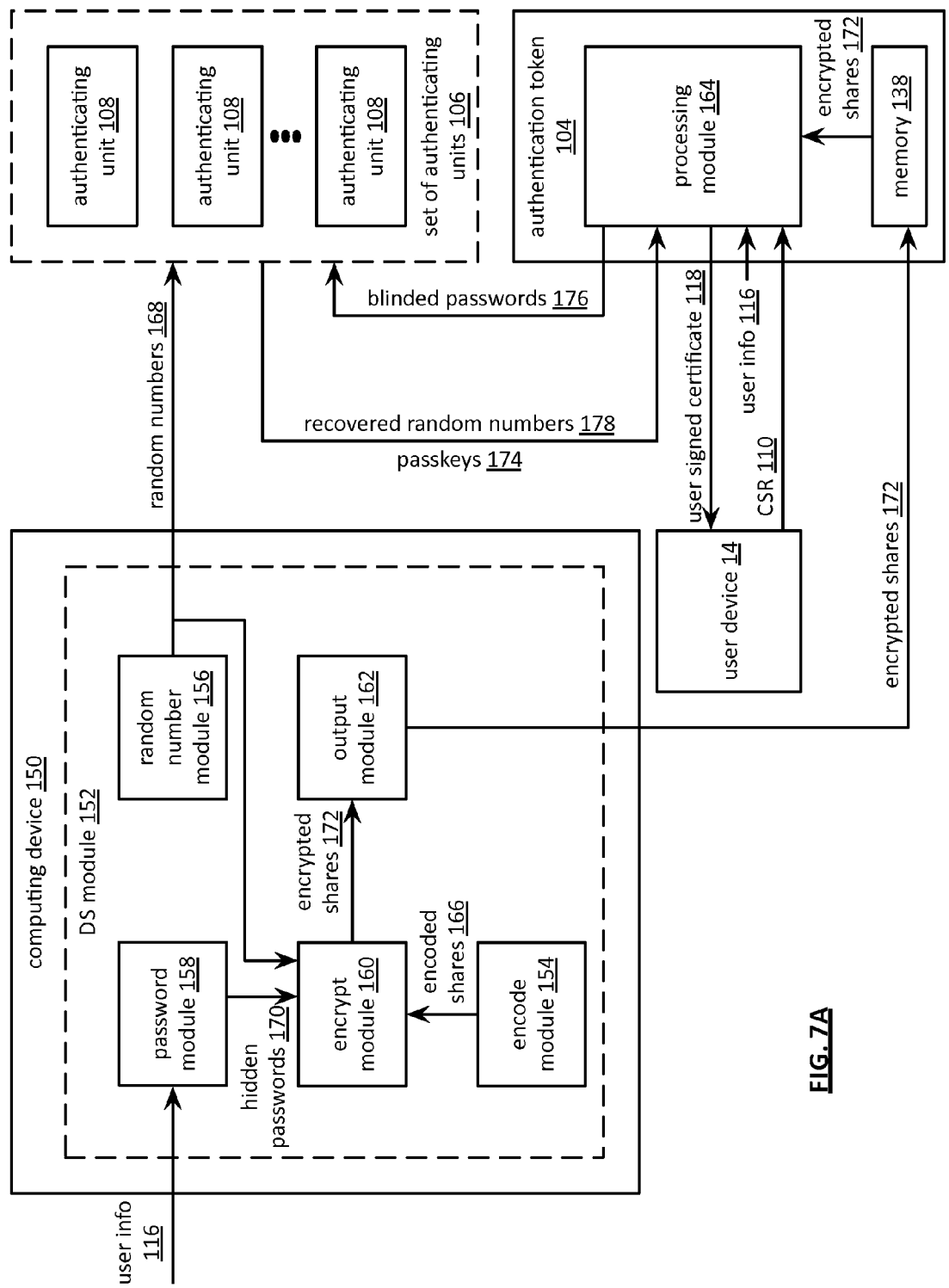
FIG. 7A is a schematic block diagram of another embodiment of an access information storage system in accordance with the present invention.

FIG. 7A is a schematic block diagram of another embodiment of an access information storage system that includes a user device 14, and authentication token 104, a set of authenticating units 106, and a computing device 150. The set of authenticating units 106 includes a set number of authenticating units 108. The authentication token 104 includes a memory 138 and a processing module 164 (e.g., a dispersed storage (DS) processing). The computing device 150 may be implemented as at least one of a DS managing unit, a managing unit, a certificate authority, a key generation unit, and a server. The computing device 150 includes a DS module 152. The DS module 152 includes an encode module 154, a random number module 156, a password module 158, an encrypt module 160, and an output module 162. The system functions to store access information in the authentication token 104 and the set of authenticating units 106 for subsequent retrieval and processing by the authentication token 104 to enable user device 14 to access a dispersed storage network (DSN).

With regards to storage of the authentication information, the encode module 154 affiliates the authentication token 104 with user information 116 of a user. For example, the encode module 154 associates a hardware identifier (ID) of the authentication token 104 to a user ID of the a user of user device 14 and stores association information in one or more of memory 138, a DSN memory, and a local record. Next, the encode module 154 generates a private/public key pairing associated with the user information 116. For example, the encode module 154 generates the private/public key pairing in accordance with a public key infrastructure approach. Next, the encode module 154 applies a share encoding function on a private key of the private/public key pairing to produce a set of encoded shares 166. The share encoding function includes at least one of a dispersed storage error encoding function and a secret sharing function. The random number module 156 generates a set of random numbers 168. The random number module 156 generates the set of random numbers 168 by obtaining a set of base random numbers and expanding each base random number of the set of base random numbers 168 based on security parameters to produce the set of random numbers 168.

The password module 158 generates a set of hidden passwords 170 based on the user information 116. The password module 158 generates the set of hidden passwords 170 by transforming a set of personalized authenticating values of the user information 116 in accordance with a set of transformation functions to produce a set of transformed personalized authenticating values. The set of personalized authenticating values includes at least one of a password, a user device identifier (ID), a user ID, a personal information number (PIN), a badge ID, a district ID, a work-shift ID, an assignment ID, a mission ID, a passcode, a picture file, a video file, an audio file, a retinal scan, a facial scan, a fingerprint scan, a personal secret, and a password index number. The transformation function includes at least one of a null function, a concatenation function, an inverting function, a hashing function, an encryption function, a compressing function, and a mask generating function. Next, for each hidden password of the set of hidden passwords 170, the password module 158 combines, in accordance with a combining function, one of the set of transformed personalized authenticating values with at least one of a constant and another one of the set of transformed personalized authenticating values to produce the hidden password. The combining function includes at least one of an addition function, a subtraction function, a multiplication function, a division function, a logical exclusive OR function, a logical OR function, and a logical AND function.

The encrypt module 160 generates a set of encryption keys based on the set of hidden passwords 170 and the set of random numbers 168. The encrypt module 160 further functions to encrypt the set of encoded shares 166 utilizing the set of encryption keys to produce a set of encrypted shares 172. For each encoded share of the set of encoded shares 166, the encrypt module 160 functions to generate an encryption key based on a corresponding one of the set of hidden passwords 170 and a corresponding one of the set of random numbers 168. The generating the encryption key includes transforming the corresponding one of the set of hidden passwords utilizing a mask generating function (MGF), security parameters, and the corresponding one of the set of random numbers. For example, the encrypt module 160 generates the encryption key by transforming an expansion of a corresponding hidden password px utilizing the mask generating function and a corresponding random numbers $e_x$ in accordance with the expression: encryption key $x=((MGF(px))^2)^{e_x}$ modulo p, where p is determined by security parameters (e.g., of dispersed storage error coding parameters). For example, key $1=((MGF(p1))^2)^{e_1}$ modulo p. In an instance, key generator 1 calculates key $1=13$ when $MGF(p1)=4$, $e_1=10$, and $p=23$, since $(4^2)^{10}$ mod $23=13$. Next, the encrypt module 160 encrypts the encoded share utilizing the encryption key to produce an encrypted share. The output module 162 outputs the set of encrypted shares 172 to the authentication token 104 for storage in memory 138 and outputs the set of random numbers 168 to the set of authenticating units 106 for storage therein.

With regards to retrieval of the authentication information, the user device 14 generates a certificate signing request (CSR) 110 regarding a user. The CSR 110 includes user information 116 regarding the user. The processing module 164 receives the CSR 110 from the user device 14 and generates the set of hidden passwords 170 based on the user information 116. The processing module 164 accesses the set of authenticating units 106 to obtain a set of passkeys 174 based on the set of hidden passwords 170 and another set of random numbers. The accessing includes generating the other set of random numbers, generating a set of blinded passwords 176 based on the set of hidden passwords 170 and the other set of random numbers, and outputting the set of blinded passwords 176 to the set of authenticating units 106.

The accessing further includes one of receiving the set of passkeys 174 from the set of authenticating 106 and generating the set of passkeys 174 based on a set of recovered random numbers 178 received from the set of authenticating units 106. For example, the set of authenticating units 106 retrieves the set of recovered random numbers 178 from memories of the set of authenticating units 106, generates the set of passkeys 174 based on the recovered random numbers 178 and the set of blinded passwords 176, and outputs the set of passkeys 174 to the processing module 164 when receiving the set of passkeys 174. As another example, the set of authenticating units 106 retrieves the set of recovered random numbers 178 from the memories of the set of authenticating units 106 based on the set of blinded passwords 176, outputs the recovered random numbers 178 to the processing module 164, where the processing module 164 generates the set of passkeys 174 based on the recovered random numbers with 178 and the set of blinded passwords 176 when generating the set of passkeys 174.

The processing module 164 retrieves a set of encrypted shares 172 from memory 138 based on the user information (e.g., from a portion of memory 138 associated with the user ID). The processing module 164 decrypts the set of encrypted shares 172 based on the set of passkeys 174 and the other set of random numbers to reproduce the set of encoded shares 166. For example, the processing module 164 generates a set of decryption keys based on the other set of random numbers and the set of passkeys 174 by generating a set of values based on the other set of random numbers and generating the set of decryption keys based on the set of values and the set of passkeys. The processing module 164 decodes, in accordance with the share encoding function, the set of encoded shares 166 to recapture the private key of the private/public key pairing (e.g., private key associated with the user).

The processing module 164 generates a user signed certificate 118 based on the private key. For example, the processing module 164 generates, utilizing the private key, a certification signature with regards to the CSR 110 and generates the user signed certificate 118 to include a certificate of CSR 110 and the certification signature. The processing module 164 discards the private key to substantially protect the private key from the user device 14. The processing module 164 outputs the user signed certificate 118 to the user device 14. The processing module 164 may discard the private key prior to outputting the user signed certificate 118, contemporaneously with the outputting of the user signed certificate 118, or after outputting the user signed certificate 118. The user device 14 may utilize the user signed certificate 118 when accessing another entity that requires an authentication process. The other entity includes one or more of a dispersed storage network, a communication network, a non-dispersed storage network storage network, and computing network.

Figure 7B:
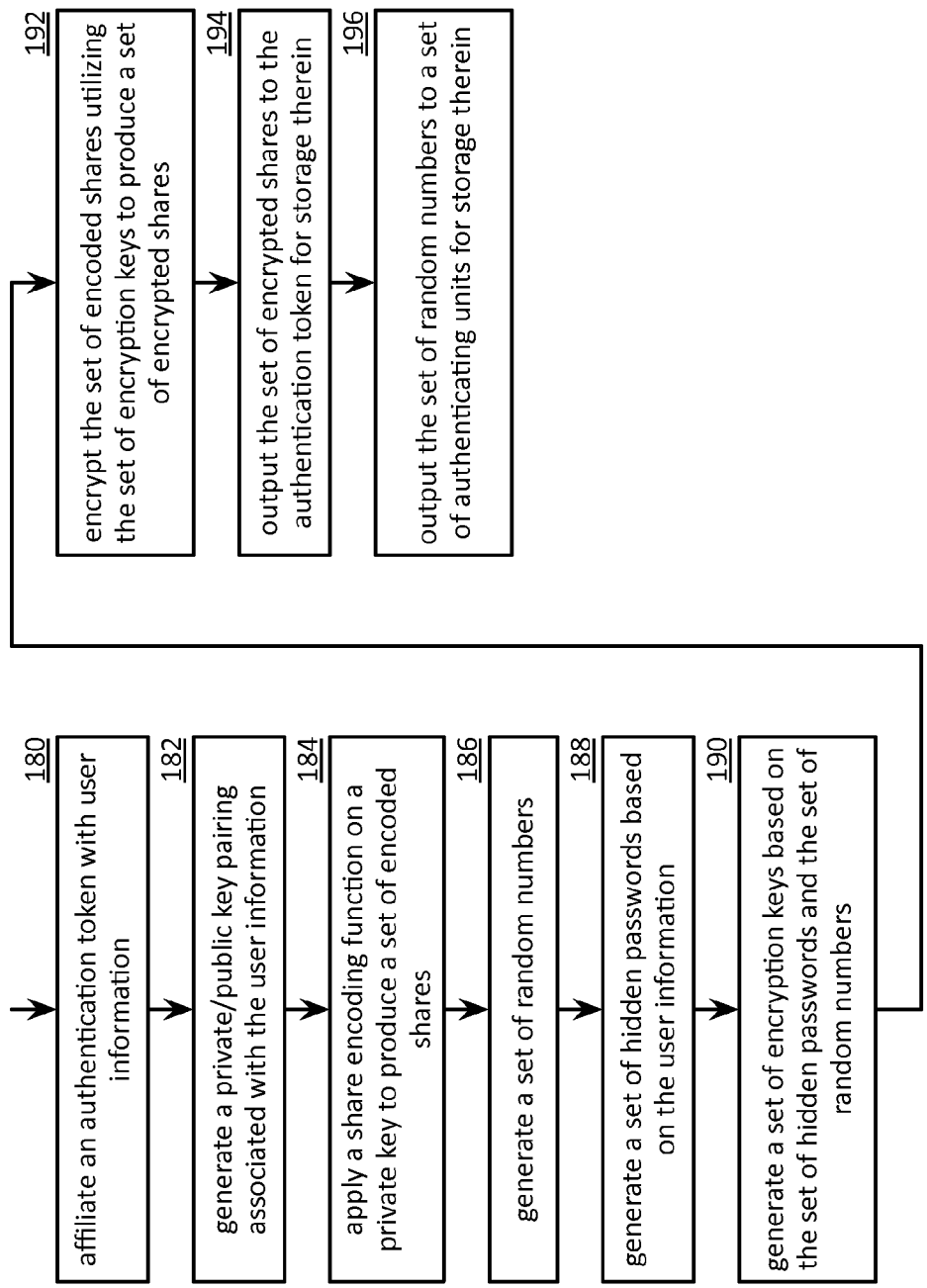
FIG. 7B is a flowchart illustrating an example of storing access information in accordance with the present invention.

FIG. 7B is a flowchart illustrating an example of storing access information. The method begins at step 180 where a processing module (e.g., of a dispersed storage (DS) imaging unit) affiliates an authentication token with user information of a user. The continues at step 182 where the processing module generates a private/public key pairing associated with the user information. For example, processing module generates the private/public key pairing to include a private key and a public key utilizing a public-key infrastructure approach such that the public key is included in the user information.

The method continues at step 184 where the processing module applies a share encoding function on the private key of the private/public key pairing to produce a set of encoded shares. The share encoding function includes at least one of a dispersed storage error encoding function and a secret sharing function (e.g., Shamir's secret sharing scheme, Blakley's scheme, Chinese Remainder Theorem scheme). For example, the processing module creates shares 1-16 in accordance with shared secret algorithm parameters when the share encoding function is the secret sharing function and N=16. As another example, the processing module dispersed storage error encodes the private key in accordance with an error coding dispersal storage function to produce shares 1-16 as encoded share slices when the share encoding function is the dispersed storage error encoding function and a pillar width is 16.

The method continues at step 186 where the processing module generates a set of random numbers. The generating the set of random numbers includes obtaining a set of base random numbers and expanding each base random number of the set of base random numbers based on security parameters to produce the set of random numbers. The generating the set of random numbers may further includes determining the security parameters. The security parameters may include one or more of a share number N, a value of security algorithm constant p (a prime number), a value of security algorithm constant q (a prime number), one or more shared secret algorithm parameters, an encryption algorithm indicator, a key generator function indicator, a key size, a random number generator function, a random number size, a hash function type indicator, a security package structure indicator, and any other parameter to specify the operation of the storing of the access information package data. The determining may be based on one or more of security requirements, a security status indicator, a user identifier (ID), a vault ID, a list, a table lookup, a predetermination, a message, and a command. For example, the processing module determines the security parameters based on a table lookup corresponding to a user ID affiliated with a user device of the user information.

As an example of generating a random number of the set of random numbers, the processing module produces a random number $e_x$ such that the bit length of the random number $e_x$ is substantially the same as a bit length of a value of security algorithm constant p and/or a bit length of a value of security algorithm constant q. For instance, the processing module produces a random number $e_3$ that is 1,024 bits in length when the security algorithm constant p is 1,024 bits in length.

The method continues at step 188 where the processing module generates a set of hidden passwords based on the user information. The generating the set of hidden passwords includes several steps. In a first step, the processing module obtains a set of personalized authenticating values. The obtaining may be based on one or more of a direct entry via a user input module (e.g., a keypad), a user device query, registration information, a lookup, a user device input, a DS managing unit input, a DS managing unit lookup, a message, and a command. For example, the processing module obtains a personal information number (PIN) as the authentication information via a query to an associated user device. As another example, the processing module performs a badge ID table lookup to obtain a badge ID as the personalized authenticating value.

In a second step, the processing module transforms the set of personalized authenticating values of the user information in accordance with a set of transformation functions to produce a set of transformed personalized authenticating values. In a third step, for each password of the set of hidden passwords, the processing module combines, in accordance with a combining function, one of the set of transformed personalized authenticating values with at least one of a constant and another one of the set of transformed personalized authenticating values to produce the password.

The method continues at step 190 where the processing module generates a set of encryption keys based on the set of hidden passwords and the set of random numbers. For each encoded share of the set of encoded shares, the processing module generates an encryption key based on a corresponding one of the set of hidden passwords and a corresponding one of the set of random numbers. The generating the encryption key includes transforming the corresponding one of the set of hidden passwords utilizing a mask generating function, security parameters, and the corresponding one of the set of random numbers. For example, the processing module generates an encryption key x based on hidden password px and corresponding random number $e_x$ in accordance with the expression key $x=((MGF(px))^2)^{e_x}$ modulo p.

The method continues at step 192 where the processing module encrypts the set of encoded shares utilizing the set of encryption keys to produce a set of encrypted shares. For each encoded share of the set of encoded shares, the processing module encrypts the encoded share utilizing the encryption key to produce an encrypted share. The encrypting may further be based on one or more of the security parameters, dispersed storage error coding parameters, a user identifier (ID), a vault ID, a vault lookup, security requirements, a security status indicator, a message, and a command.

The method continues at step 194 where the processing module outputs the set of encrypted shares to the authentication token for storage therein. The outputting includes at least one of storing the set of encrypted shares and the security parameters in a memory of the authentication token, sending the set of encrypted shares and the security parameters to the authentication token, sending the set of encrypted shares and the security parameters to the DSN memory for storage therein, sending the set of encrypted shares and the security parameters to the set of authenticating units for storage therein, sending the set of encrypted share and the security parameters to a dispersed storage (DS) processing unit, and dispersed storage error encoding the set of encrypted shares and the security parameters to produce a plurality of encoded share slices and outputting the plurality of encoded share slices for storage.

The method continues at step 196 where the processing module outputs the set of random numbers to a set of authenticating units. The outputting includes identifying a set of storage locations associated with the set of authenticating units. For example, the processing module performs a lookup to retrieve internet protocol (IP) addresses of the set of storage locations and outputs the set of random numbers to corresponding IP addresses.

Figure 8:
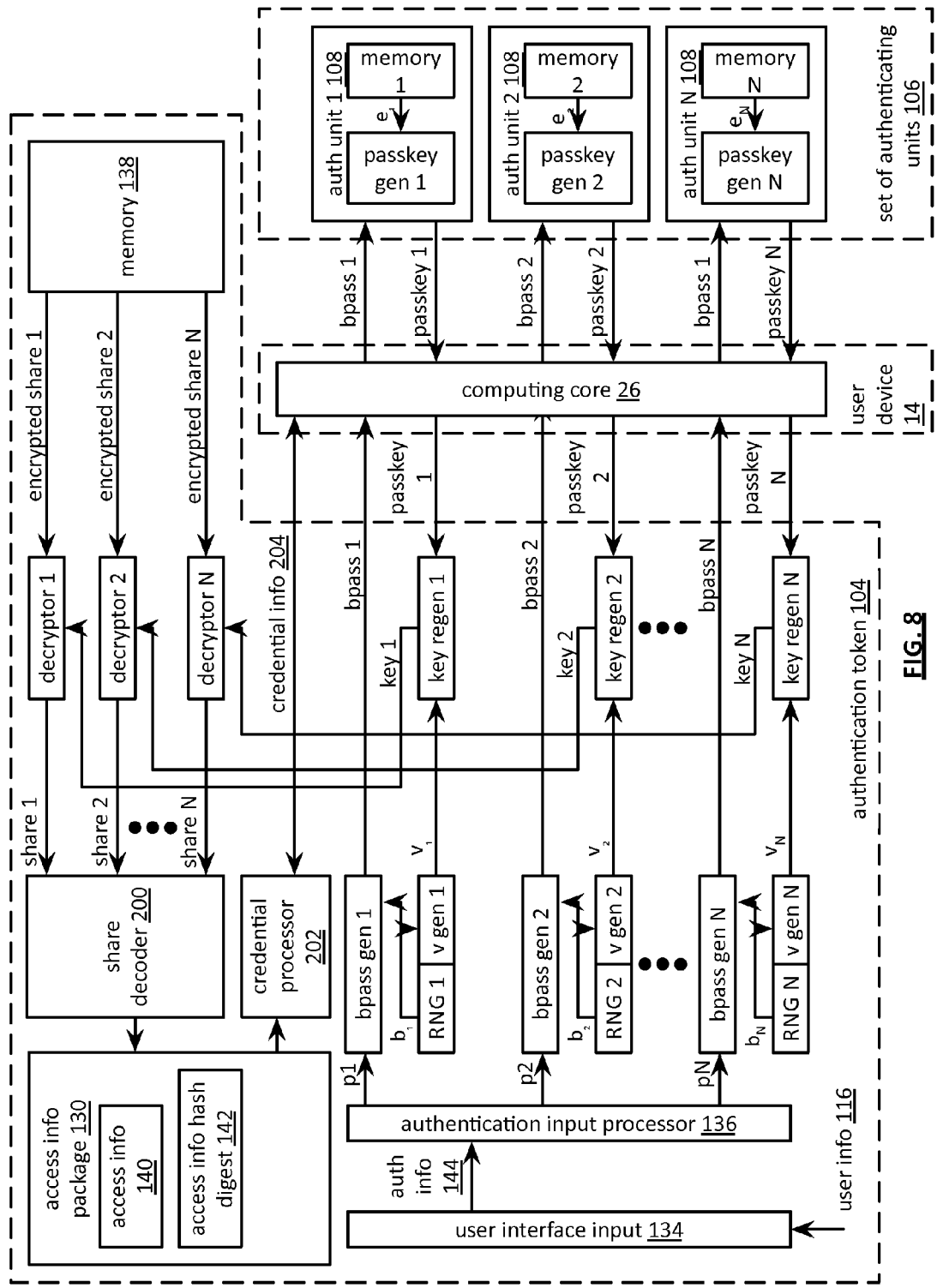
FIG. 8 is a schematic block diagram of an embodiment of an access information retrieval system in accordance with the present invention.

FIG. 8 is a schematic block diagram of an embodiment of an access information retrieval system that includes a token device 104, a user device 14, and a set of authenticating units 106. The set of authenticating units 106 includes a set number of authenticating units 108. Each authenticating unit 108 of the set of authenticating units 106 includes a memory of a set of memories 1-N and a passkey generator of a set of passkey generators 1-N. At least one authenticating unit 108 of the set of authenticating units 106 may be implemented utilizing at least one dispersed storage (DS) processing unit and a dispersed storage network (DSN) memory. The user device 14 includes a computing core 26. The authentication token 104 includes an access information package 130, a share decoder 200, a credential processor 202, an authentication input processor 136, a user interface input 134, a set of random number generators (RNG) 1-N, a set of blinded password generators 1-N (e.g., bpass gen 1-N), a set of value generators (e.g., v gen 1-N), a set of key regenerators (e.g., key regen 1-N), a set of decryptors 1-N, and a memory 138.

The access information package 130 includes access information 140 recovered as described below and an access information hash digest 142. The access information hash digest 142 may be utilized in a subsequent integrity verification step to verify that the access information 140 has not been tampered with. The credential processor 202 provides the user device 14 with credential information 204 based on the access information 140 such that the user device 14 may subsequently gain access to a system (e.g., an information system, a data storage system, a communication system, a control system, etc.). The credential information may include one or more of user information 116 from the user device 14, a certificate signing request (CSR) from the user device 14, a user signed certificate from the credential processor 202. For example, the user device 14 generates a CSR and sends a CSR to the credential processor 202. The credential processor 202 recovers access information 140 and generates the user device signed certificate utilizing a private key of the access information 140.

The credential processor 202 recovers the access information 140 when the access information 140 is not readily available. For example, the credential processor 202 recovers access information 140 in response to each CSR received from the user device 14. As another example, the credential processor 202 recovers the access information 140 when a time of validity indicator associated with the access information 140 indicates that the access information 140 is no longer valid. One of the credential processor 202 and another entity of the authentication token 104 may delete the access information 140 from time to time to provide improved security. Next, the credential processor sends 202 the user signed certificate to the computing core 26 of the user device 14. Computing core 26 utilizes the user signed certificate to gain access to the system without any exposure of the private key of the access information 140.

With regards to recovering the access information 140, the authentication input processor 136 receives authentication information 144 from the user interface input 134 (e.g., a password and personal identification number (PIN) are received from a keypad of the authentication token 104 and is user information 116). The authentication input processor 136 generates a set of hidden passwords p1-pN based on the authentication information 144. For example, the authentication input processor 136 obtains a badge identifier (ID) as the authentication information 144 from a user input and calculates a hash of the badge ID to produce a first intermediate result. Next, the authentication input processor 136 obtains a talk group ID as second authentication information and adds the talk group ID to the first intermediate result to produce a hidden password core. The authentication input processor 136 partitions the hidden password core to produce the set of hidden passwords p1-pN. Alternatively, the authentication input processor 136 replicates the hidden password core to produce the set of hidden passwords p1-pN.

The set of random number generators 1-N generate a set of random numbers $b_1$-$b_N$. For example, each random number generator of the set of random number generators 1-N generates a random number of the set of random numbers $b_1$-$b_N$ such that each random number includes a same number of bits as a number of bits of p, wherein p is extracted from dispersed storage error coding parameters and/or security parameters retrieved from the memory. The set of random number generators 1-N output the set of random numbers $b_1$-$b_N$ to the set of blinded password generators 1-N and to the set of value generators 1-N.

The set of blinded password generators 1-N generate a set of blinded passwords (bpass) 1-N based on the security parameters, the set of random numbers $b_1$-$b_N$, and the set of hidden passwords p1-pN. The set of blinded passwords 1-N are generated such that each blinded password includes a same number of bits as a number of bits of security perimeter p. For example, the set of blinded password generators 1-N generate the set of bpass 1-N values by transforming an expansion of each of the set of hidden password p1-pN into the same number of bits as the security parameter constant p utilizing a mask generating function (MGF) and a corresponding one of the set of random numbers $b_1$-$b_N$ in accordance with the expression bpass $x=((MGF(px))^2)^{b_x}$ modulo p. For example, bpass $1=((MGF(p1))^2)^{b_1}$ modulo p. In an instance, blinded password generator 1 generates bpass 1=18 when MGF(p1)=4, $b_1$=7, and p=23, since $(4^2)^7$ mod 23=18. The set of blinded password generators 1-N outputs the set of bpass 1-N values to the set of authenticating units 106 via the user device 14. At least one of the authentication token 104 and the user device 14 determines a set of addresses associated with the set of authenticating units 106 and sends the set of bpass 1-N values to the set of authenticating units 106 utilizing the set of addresses.

The set of value generators 1-N generate a set of values $v_1$-$v_N$ based on the set of random numbers $b_1$-$b_N$ and the value of a security parameters constant q in accordance with an expression b*v modulo q=1. The value of q is based on a value of p in accordance with the expression q=(p−1)/2. For example, q=11 when p=23. For instance, value generator 1 generates a value v1=8 when $b_1$=7 and q=11 since 7*8=56 and 56 modulo 11=1. The set of value generators 1-N output the set of values $v_1$ through $v_N$ to the set of key regenerators 1-N.

Each passkey generator of the set of passkey generators 1-N retrieves a previously stored random number value of a set of random number values $e_1$ through $e_N$ from a memory of a set of memories 1-N to produce a recovered random number of a set recovered random numbers $e_1$ through $e_N$ in response to receiving a passkey request from the user device that includes a corresponding blinded password (bpass) of the set of blinded passwords 1-N. The set of passkey generators 1-N generate a set of passkeys 1-N based on the set of recovered random numbers $e_1$ through $e_N$ and the set of bpass 1-N values in accordance with an expression passkey $x=(bpass\ x)^{e_x}$ modulo p. For example, passkey generator 1 generates a passkey 1=9 when bpass 1=18, $e_1$=10, and p=23 since $(18)^{10}$ modulo 23=9. The set of passkey generators 1-N outputs the set of passkeys 1-N to the set of key regenerators 1-N (e.g., via the user device 14).

The key regenerators 1-N regenerate a set of keys 1-N based on the set of passkeys 1-N and the set of values $v_1$ through $v_N$ in accordance with an expression key $x=(passkey\ x)^{v_x}$ modulo p. For example, key regenerator 1 regenerates key 1 such that key 1=13 when passkey 1=9, v1=8, and p=23 since $(9)^8$ modulo 23=13. The set of key regenerators 1-N output the set of keys 1-N to the set of decryptors 1-N.

The set of decryptors 1-N retrieves a set of encrypted shares 1-N from the memory 138. Alternatively, the set of decryptors 1-N facilitates retrieving a set of a plurality of sets of encoded encrypted share slices from the DSN memory and decoding the set of the plurality of sets of encoded encrypted share slices to reproduce the set of encrypted shares 1-N. The decryptors 1-N decrypt the set of encrypted shares 1-N utilizing the set of keys 1-N in accordance with a decryption algorithm to produce encoded shares 1-N. Alternatively, the decryptors 1-N decrypt the encrypted shares 1-N to produce encoded data slices as the shares 1-N. The decryption algorithm may function in accordance with operational parameters and/or the security parameters of the token device. For example, each of the decryptors 1-N utilizes substantially the same decryption algorithm in accordance with the operational parameters and/or security parameters. Alternatively, at least two of the decryptors 1-N utilize a different decryption algorithm in accordance with the operational parameters and/or the security parameters. The decryptors 1-N output the set of encoded shares 1-N to the share decoder 200.

The share decoder 200 decodes at least a decode threshold number of encoded shares 1-N to recover the access information package 130 (e.g., including the private key). The decoding may include at least one of dispersed storage error decoding the encoded shares 1-N and decoding the encoded shares 1-N utilizing a secret sharing function to reproduce the access information package 130. For example, the share decoder 200 decodes the set of encoded shares utilizing a Shamir secret sharing algorithm. As another example, the share decoder 200 decodes at least the decode threshold number of encoded shares 1-N (e.g., encoded data slices) in accordance with an error coding dispersal storage function to produce the access information package 130. The method to retrieve securely stored access information package 130 is discussed in greater detail with reference to FIG. 9.

Next, at least one of the share decoder 200 and the credential processor 202 may validate the access information 140 utilizing the access information hash digest 142. For example, the validating includes comparing the access information hash digest 142 to a calculated access information hash digest of the access information 140 and indicating that the access information 140 as valid one the comparison is favorable (e.g., substantially the same). The credential processor 202 may now utilize the private key of the access information 140 to produce the certification signature in response to receiving the CSR from the user device 14.

FIG. 9 is a flowchart illustrating an example of retrieving access information, which includes similar steps to FIG. 7B. The method begins at step 210 where a processing module (e.g., of an authentication token) receives a certificate signing request (CSR) from a user device regarding a user, wherein the CSR includes user information regarding the user. The method continues with step 188 of FIG. 7B where the processing module generates a set of hidden passwords based on the user information.

The method continues at step 214 where the processing module accesses a set of authenticating units to obtain a set of passkeys based on the set of hidden passwords and a set of random numbers. The accessing the set of authenticating units includes at least one of two alternative sets of steps. In a first step of a first alternative, the processing module generates the set of random numbers. The generating the set of random numbers includes obtaining a set of base random numbers and expanding each base random number of the set of base random numbers based on security parameters to produce the set of random numbers. In a second step of the first alternative, the processing module generates a set of blinded passwords based on the set of hidden passwords and the set of random numbers. The generating the set of blinded passwords includes for each random number of the set of random numbers, transforming a corresponding hidden password of the set of hidden passwords utilizing a mask generating function and the random number to produce a blinded password of the set of blinded passwords. In a third step of the first alternative, the processing module identifies the set of authenticating units based on the user information (e.g., a set of Internet protocol (IP) addresses). A fourth step of the first alternative, the processing module outputs the set of blinded passwords to set of identified authenticating units (e.g., via a user device). In a fifth step of the first alternative, processing module receives the set of passkeys from the set of identified authenticating units (e.g., via the user device) in response to receiving the set of blinded passwords.

In a first step of a second alternative of accessing the set of authenticating units, the processing module generates the set of random numbers. In a second step of the second alternative processing module generates the set of blinded passwords based on the set of hidden passwords and the set of random numbers. In a third step of the second alternative, the processing module identifies the set of authenticating units based on the user information. In a fourth step of the second alternative, the processing module retrieves (e.g., via user device) a set of recovered random numbers from the set of identified authenticating units. The set of recovered random numbers correspond to another set of random numbers stored in the set of identified authenticating units by a managing unit. In a fifth step of the second alternative, the processing module generates the set of passkeys based on the set of blinded passwords and the set of recovered random numbers. The generating of a passkey includes transforming a corresponding blinded password utilizing a modulo function based on a corresponding recovered random number of the set of recovered random numbers and security parameters to produce the passkey. The generating of the set of passkeys may be performed by the set of authenticating units when receiving the set of passkeys from the set of identified authenticating units.

The method continues at step 216 where the processing module retrieves a set of encrypted shares based on the user information (e.g., from a memory of the authentication token where the memories associated with a user identifier (ID) of the user). The method continues at step 218 where the processing module decrypts the set of encrypted shares based on the set of passkeys and the set of random numbers to produce a set of encoded shares. The decrypting the set of encrypted shares includes generating a set of encryption keys based on the set of passkeys and the set of random numbers. The generating includes generating a set of values based on the set of random numbers and generating the set of encryption keys based on the set of values and the set of passkeys. The generating the set of values includes transforming the set of random numbers utilizing a modulo function based on security parameters to produce the set of values. The generating the set of encryption keys based on the set of values and the set of passkeys includes, for each passkey of the set of passkeys, transforming the passkey utilizing a modulo function based on security parameters and a corresponding value of the set of values to produce an encryption key of the set of encryption keys. The decrypting further includes decrypting the set of encrypted shares utilizing the set of encryption keys to reproduce the set of encoded shares.

The method continues at step 220 where the processing module decodes, in accordance with a share encoding function, the set of encoded shares to recapture a private key associated with the user. The decoding the set of encoded shares includes at least one of decoding the set of encoded shares using a secret share function as the share encoding function and decoding the set of encoded shares using a dispersed storage error encoding function as the share encoding function.

The method continues at step 222 where the processing module generates a user signed certificate based on the private key. The generating a user signed certificate includes generating, on behalf of the user, a certification signature based on the private key and generating the signed certificate based on a certificate of the CSR and the certification signature such that the user device uses the signed certificate to obtain a certificate authority signed certificate from a certificate authority to access a dispersed storage network. The method continues at step 224 where the processing module discards the private key to substantially protect the private key from the user device. For example, the processing module deletes the private key from memory of the authentication token. The method continues at step 226 where the processing module outputs the user signed certificate to the user device.

The methods described above operate in accordance with mathematical expressions enabling generation of encryption keys utilized to encrypt and decrypt shares of an access information package. The mathematical expressions may be further understood in consideration of the following mathematical proof, wherein the proof illustrates that a recovered encryption key (e.g., to decrypt an encrypted share) is substantially equivalent to an original encryption key (e.g., utilized to encrypt the share to produce the encrypted share).

Proof—Recall that:

$$b*v=1 \bmod q \text{ and } p=2*q+1$$

This proof will illustrate that:

$$(MGF(password)^2)^{(b*e*v)} \text{equals (MGF}(password)^2)^e (\bmod p)$$

First, replace MGF(password) with X:

$$(X^2)^{(b*e*v)}=(X^2)^{(e)} (\bmod p)$$

Note that:
Since b*v=1 mod q, it follows that: b*v=n*q+1, for some integer n. Note that (b*v)/q=n remainder 1.
Therefore (b*v) can be substituted with (n*q+1) in the above expression yielding:

$$(X^2)^{((n*q+1)*e)} \bmod p$$

Since p=2*q+1, taking p out of the formula, resulting in:

$$(X^2)^{((n*q+1)*e)} \bmod (2*q+1)$$

Since X^2 is raised to a power, simply take X to the power of twice the exponent:

$$X^{(2*(nq+1)*e)} \bmod (2q+1)$$

Which may be written as:

$$X^{((2nq+2)*e)} \bmod (2q+1)$$

Multiplying both parts by e:

$$X^{(2nqe+2e)} \bmod (2q+1)$$

Split these out as so:

$$X^{(2neq)}*X^{(2e)} \bmod (2q+1)$$

Re-write the first power of X:

$$X^{(2q*ne)}*X^{(2e)} \bmod (2q+1)$$

Which can also be written as:

$$(X^{(2q)})^{(ne)}*X^{(2e)} \bmod (2q+1)$$

Un-doing a the substitution of p for 2q+1, find:

$$(X^{(p-1)})^{(ne)}*X^{(2e)} \bmod p$$

Fermat's Little Theorem shows that for any prime number P, and any integer X, that:
X^(P-1)=1 mod P, therefore (X^(p-1)) mod p=1 mod p. This yields:

$$1^{(ne)}*X^{(2e)} \bmod p$$

Which is the same as:

$$1 * X^{(2e)} \mod p$$

Which is this which is the same as the key:

$$(X^2)^e \mod p$$

As a numerical example:
p=23
q=(p−1)/2=11
let e1=10
let [mask generating function (common password)]^2=16
key 1=16^e1 mod 23=13
let b1=7
bpass 1=16^7 mod 23=18
passkey 1=bpass^e1 mod p=18^10 mod 23=9
b*v=1 modulo q
b1*v1=1 mod q
7*v1=1 mod 11 note: 56 mod 11=1 so v1=8
regen key 1=passkey1^v1 modulo p
9^8 mod 23=13, which checks with the 13 calculated above for key 1, which is the key.

Figure 10C:
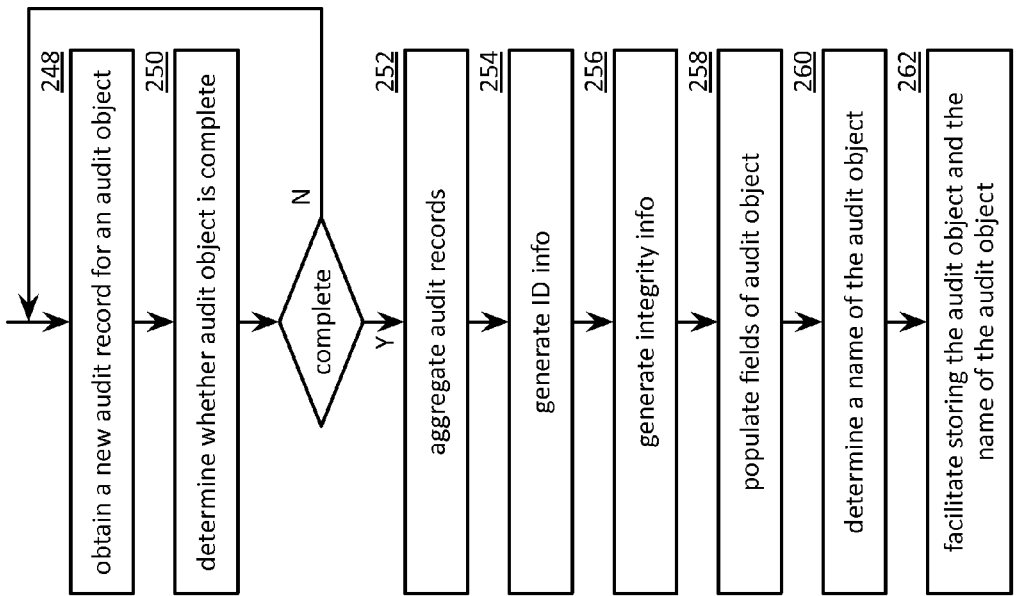
FIG. 10C is a flowchart illustrating an example of generating an audit object in accordance with the present invention.
Figure 10A:
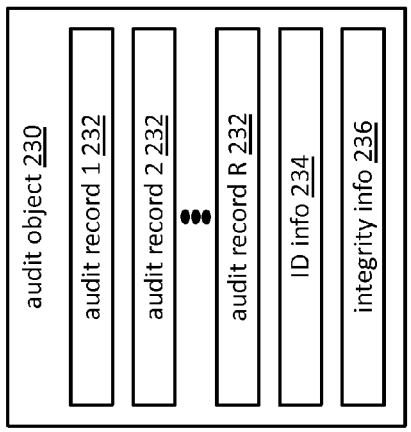
FIG. 10A is a diagram illustrating an example of an audit object in accordance with the present invention.

FIG. 10A is a diagram illustrating an example of an audit object 230 structure. The audit object 230 includes fields for a plurality of audit records 1-R 232, a field for identifier (ID) information 234, and a field for integrity information 236. Each audit record field 232 of the audit records 1-R 232 includes an audit record entry including information related to transactions within a dispersed storage network (DSN). Audit record content is discussed in greater detail with reference to FIG. 10B. The ID information field 234 includes an ID information entry including an originator ID associated with the audit object (e.g., an ID of an entity that created the audit object). The integrity information field 236 includes an integrity information entry including one or more of a device ID, a certificate chain, and a signature.

Figure 10B:
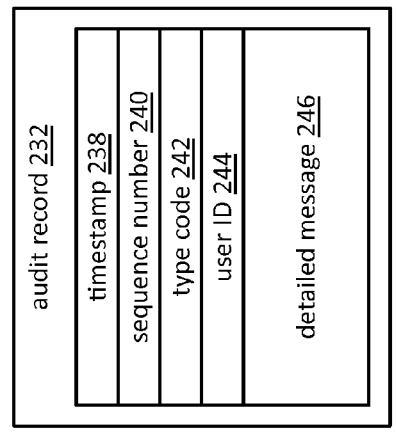
FIG. 10B is a diagram illustrating an example of an audit record in accordance with the present invention.

FIG. 10B is a diagram illustrating an example of an audit record 232 structure. The audit record 232 includes a timestamp field 238, a sequence number field 240, a type code field 242, a user identifier (ID) field 244, and a detailed message field 246. The timestamp field 238 includes a timestamp entry including a creation timestamp associated with a date and/or a time when the audit record 232 was created. The sequence number field 240 includes a sequence number entry including a unique monotonically increasing number associated with a transaction within a dispersed storage network (DSN). The type code field 242 includes a type code entry including record type indicator (e.g., a data access audit event or an authentication audit event). The user ID field 244 includes a user ID entry including an identifier of one or more principals (e.g., DSN system entities) associated with the audit record causing creation of the audit record. The detailed message field 246, when utilized, includes a detailed message entry including more information associated with the audit record 232 including an operation type (e.g., such as one of write, read, delete, login), a remote address (e.g., an Internet protocol address), a data object identifier, and a target vault ID.

FIG. 10C is a flowchart illustrating an example of generating an audit object. The method begins at step 248 where a processing module (e.g., a dispersed storage (DS) processing unit) obtains a new audit record for an audit object. The obtaining includes at least one of generating the new audit record and receiving the new audit record (e.g., from any device of a dispersed storage network (DSN) such as a DS unit). The method continues at step 250 where the processing module determines whether the audit object is complete. The determination may be based on comparing a number of audit records of the audit object to an audit record threshold. For example, the processing module determines that the audit object is complete when the number of audit records of the audit object is greater than the audit record threshold. The method loops back to step 248 when the processing module determines that the audit object is not complete. The method continues to step 252 when the processing module determines that the audit object is complete.

The method continues at step 252 where the processing module aggregates audit records of the audit object within the audit object by generating the audit object to include the audit records. The method continues at step 254 where the processing module generates identifier (ID) information. The generation includes at least one of utilizing an ID associated with the processing module (e.g., originator), querying another device for the ID information, and receiving the ID information. The method continues at step 256 where the processing module generates integrity information. The generation includes one or more of obtaining a certificate, generating a signature of the certificate, and calculating a hash of the audit object.

The method continues at step 258 where the processing module populates fields of the audit object with the audit records, the ID information, and the integrity information. The method continues at step 260 where the processing module determines a name of the audit object. A format of the name may be consistent with a virtual DSN address associated with accessing the audit object when stored as a plurality of audit object slices in the DSN and may include a text string name, a sequence number, a timestamp when created, and a timestamp associated with when the audit object may be deleted to enable a DS unit to autonomously delete a stored audit object when it is time to delete the audit object. The method continues at step 262 where the processing module facilitates storing the audit object and the name of the audit object. The facilitation includes at least one of storing the audit object and the name of the audit object and sending the audit object and the name of the audit object to the DSN for storage therein.

Figure 11A:
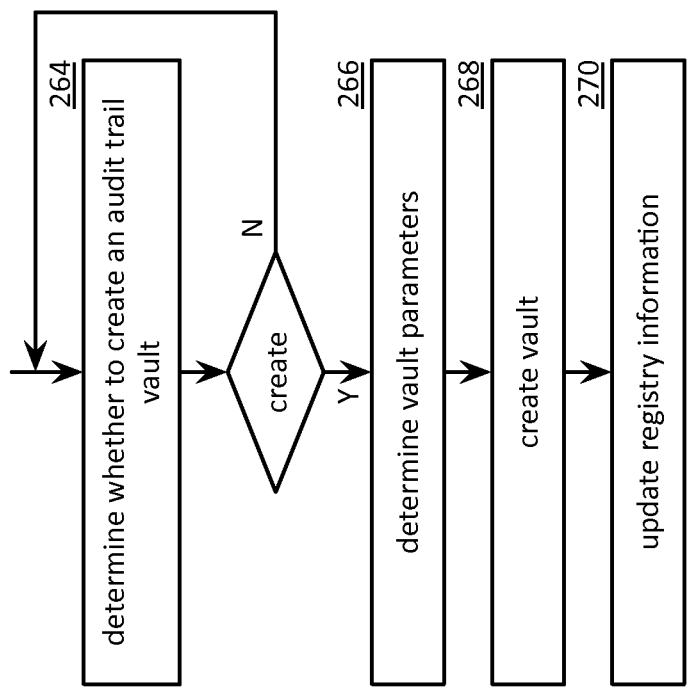
FIG. 11A is a flowchart illustrating an example of creating a system audit trail vault in accordance with the present invention.

FIG. 11A is a flowchart illustrating an example of creating a system audit trail vault. The audit trail vault may be utilized to store audit objects in a dispersed storage network (DSN) memory. The method begins at step 264 where a processing module (e.g., a dispersed storage (DS) managing unit) determines whether to create an audit trail vault. The determination may be based on audit information availability and DSN system entity provisioning. For example, the processing module determines to create the audit trail vault when an audit object has been created and is ready to be stored in the DSN memory. As another example, the processing module determines to create the audit trail vault when a first DS unit is provisioned and ready for operation within the DSN. The method loops at step 264 when the processing module determines not to create the audit trail vault. The method continues to step 266 when the processing module determines to create the audit trail vault.

The method continues at step 266 where the processing module determines vault parameters. The vault parameters includes one or more of allocated storage capacity, a pillar width, a decode threshold, a write threshold, a read threshold, a permissions list (e.g., write for all devices, read for a manager and a security officer), and a deletion policy. The determination may be based on one or more of a number of provisioned entities within the DSN, a number of active user devices, an audit trail vault provisioning policy, a lookup, a predetermination, and a message.

The method continues at step 268 where the processing module creates the audit trail vault. The creation includes at least one of generating a vault identifier (ID), generating a DSN address of the audit trail vault, updating a DSN address to DS unit location table to associate the DSN address of the audit trail vault to a set of DS units that are utilized to store the audit trail vault, and updating a directory to associate the audit trail vault ID to the DSN address of the audit trail vault. The method continues at step 270 where the processing module updates registry information to produce modified registry information. The update includes one or more of modifying the registry information to include the audit trail vault ID, pushing the modified registry information to system entities of the DSN, and sending the modified registry information to system entities of the DSN based on receiving a registry information request.

Figure 11B:
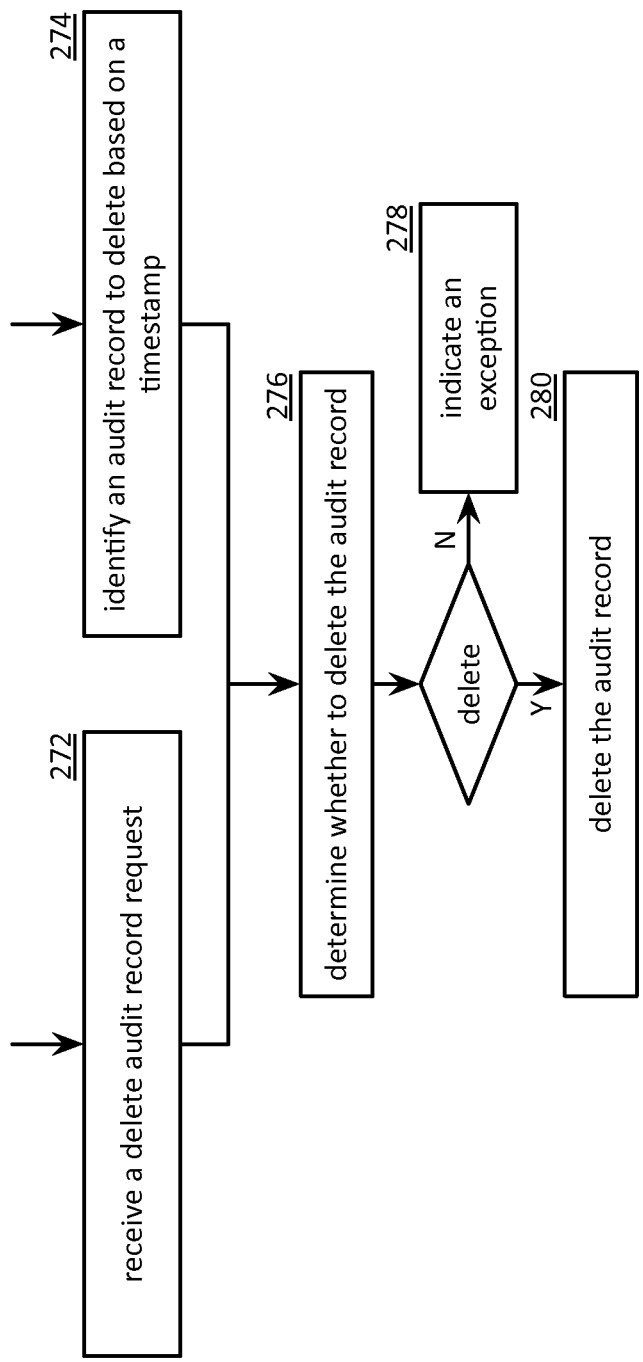
FIG. 11B is a flowchart illustrating an example of deleting an audit record in accordance with the present invention.

FIG. 11B is a flowchart illustrating an example of deleting an audit record. The method begins with either step 272 or step 274. At step 272, a processing module (e.g., of a dispersed storage (DS) unit) receives a delete audit record request (e.g., from a dispersed storage network (DSN) system entity). At step 274, the processing module identifies an audit record to delete based on a timestamp. The processing module modifies the audit record to delete when a deletion timestamp is greater than a current time and/or when a difference between the current time and a large record creation timestamp is greater than a deletion time threshold. The processing module may obtain the timestamp based on at least one of extraction of the timestamp from a name of an associated audit object and extraction of the timestamp from the audit record or the audit object associated with the audit record.

The method continues at step 276 where the processing module determines whether to delete the audit record. The determination may be based on one or more of comparing a deletion input (e.g., an audit record ID of the audit record to delete based on the delete audit record request or the edification of the audit record to delete based on the timestamp) to a deletion policy, an audit record storage utilization level indicator, an audit record size indicator, and an audit vault utilization frequency level. For example, the processing module determines to not delete the audit record when the deletion policy indicates to not delete audit records when the audit record storage utilization level is below a low utilization threshold. As another example, the processing module determines to delete the audit record when the deletion policy indicates to delete audit records when the audit record storage utilization level is above a low utilization threshold when a delete audit record request is received or when an audit record timestamp indicates to delete the audit record.

The method branches to step 280 when the processing module determines to delete the audit record. The method continues to step 278 when the processing module determines to not delete the audit record. The method continues at step 278 where the processing module indicates an exception when the processing module determines to not delete the audit record. The processing module indicates the exception by at least one of sending a message to a DS managing unit and sending a message to a requesting entity (e.g., that sent the delete audit record request).

The method continues at step 280 where the processing module deletes the audit record when the processing module determines to delete the audit record. The deletion includes at least one of removing the audit record from the associated audit object to produce a modified audit object, updating integrity information associated with the modified audit object to produce modified integrity information, storing the modified integrity information in the modified audit object, and storing the modified audit object in the DSN.

Figure 12:
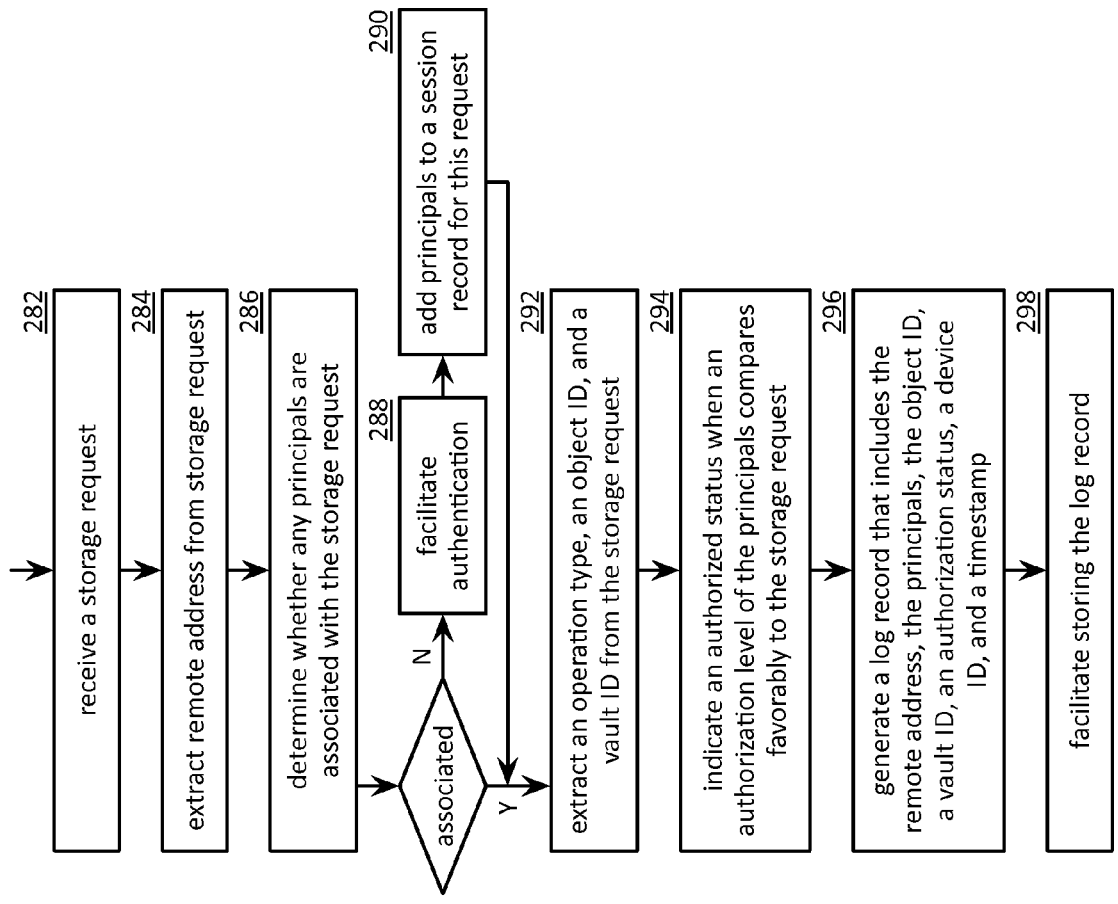
FIG. 12 is a flowchart illustrating an example of generating a storage request log record in accordance with the present invention.

FIG. 12 is a flowchart illustrating an example of generating a storage request log record. The method begins with step 282 where a processing module (e.g., a dispersed storage (DS) processing unit) receives a storage request. The storage request includes a dispersed storage network (DSN) access request including one of a write request, a read request, a delete request, and a login request. The method continues at step 284 where the processing module extracts a remote address from the storage request. The remote address is associated with the sending entity of the storage request. The extracting includes interpreting a media access control (MAC) address when Ethernet transport is utilized and extracting an internet protocol address when an internet protocol is utilized.

The method continues at step 286 where the processing module determines whether any principals are associated with the storage request. The determination may be based on identifying one or more principal identifiers (IDs) from the storage request. The method branches to step 292 when the processing module determines that principals are associated with the storage request. The method continues to step 288 when the processing module determines that principals are not associated with the storage request. The method continues at step 288 where the processing module facilitates authentication. The facilitation includes at least one of verifying a user name and/or a password of the storage request and initiating a transport layer security (TLS) handshake. The method continues at step 290 where the processing module adds the principals to a session record for this request.

The method continues at step 292 where the processing module extracts an operation type, an object ID, and a vault ID from the storage request. The method continues at step 294 where the processing module generates an authorization status that indicates an authorized status when an authorization level of the principals compares favorably to a required authorization level of the storage request. The processing module may receive an access control list (ACL) from a DS managing unit and extract authorization levels associated with the principals from the ACL. The processing module generates the authorization status to indicate an un-authorized status when the authorization level the principals compares unfavorably to the required authorization level of the storage request.

The method continues at step 296 where the processing module generates a log record that includes one or more of the remote address, the principals, the object ID, the vault ID, the authorization status, a device ID, and a timestamp. The method continues at step 298 where the processing module facilitates storing the log record. The facilitation includes at least one of generating an audit record, generating an audit object, storing the audit record, sending the audit record to a DS processing unit to store the audit record in a DSN memory.

Figure 13:
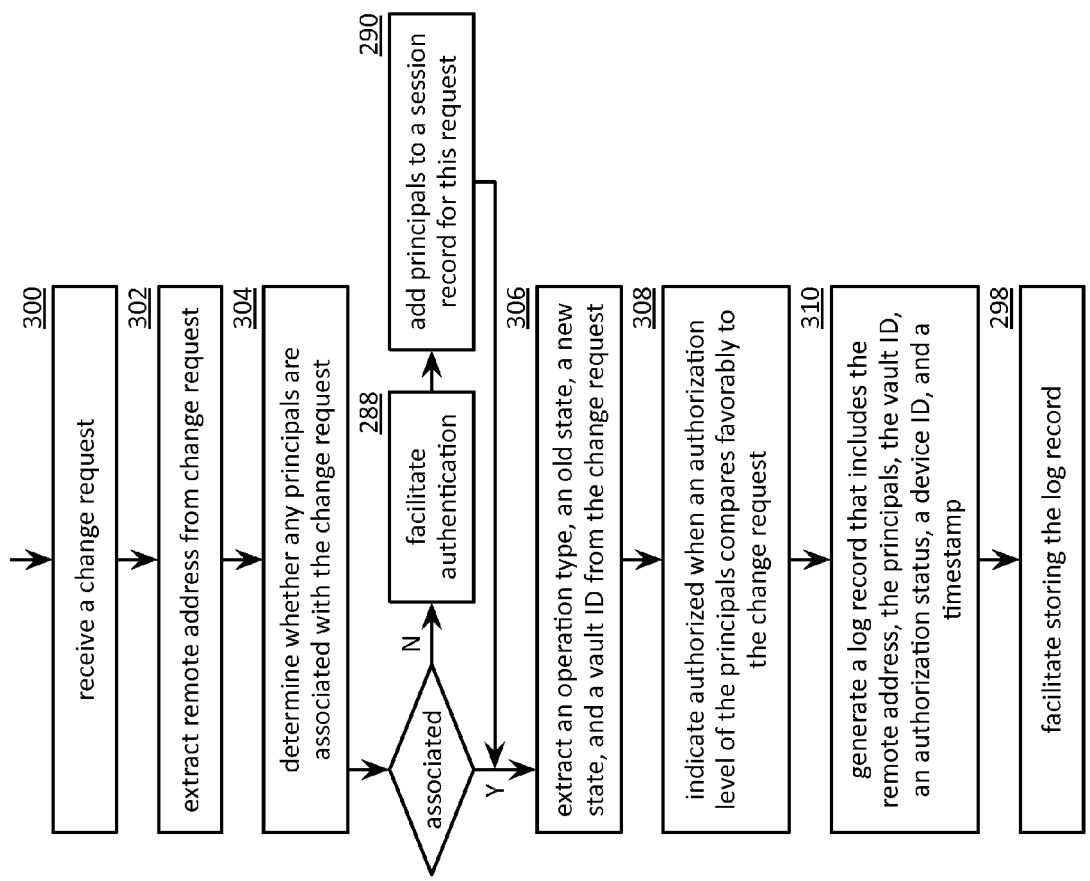
FIG. 13 is a flowchart illustrating an example of generating a management modification log record in accordance with the present invention.

FIG. 13 is a flowchart illustrating an example of generating a management modification log record, which includes similar steps to FIG. 12. The method begins at step 300 where a processing module (e.g., of a dispersed storage (DS) managing unit) receives a change request. The change request includes at least one of a request to add a user device to a list of authorized users of a dispersed storage network (DSN), a request to change access rights associated with a user device, a request to create a new vault, and a request to delete an existing vault. The method continues at step 302 where the processing module extracts a remote address from the change request. The remote address is associated with the sending entity of the change request. The remote address may be extracted from the change request by interpreting a media access control (MAC) address when Ethernet transport is utilized and extracting an internet protocol address when an internet protocol is utilized.

The method continues at step 304 where the processing module determines whether any principals are associated with the change request. The determination may be based on identifying one or more principal identifiers (IDs) from the change request. The method branches to step 306 when the processing module determines that principals are associated with the change request. The method continues to step 288 of FIG. 12 when the processing module determines that principals are not associated with the change request. The method continues with steps 288-290 of FIG. 12 where the processing module facilitates authentication and adds the principals to a session record for this request.

The method continues at step 306 where the processing module extracts an operation type, a previous management record state, a new management record state, and a vault ID from the change request. The method continues at step 308 where the processing module generates an authorization status that indicates an authorized status when an authorization level of the principals compares favorably to a required authorization level of the change request. The processing module may receive an access control list (ACL) from a DS managing unit and extract authorization levels associated with the principals from the ACL. The processing module generates the authorization status to indicate an un-authorized status when the authorization level the principals compares unfavorably to the required authorization level of the change request. The method continues at step 310 where the processing module generates a log record that includes one or more of the remote address, the principals, the vault ID, the authorization status, a device ID, and a timestamp. The method continues at step 298 of FIG. 12 where the processing module facilitates storing the log record.

Figure 14:
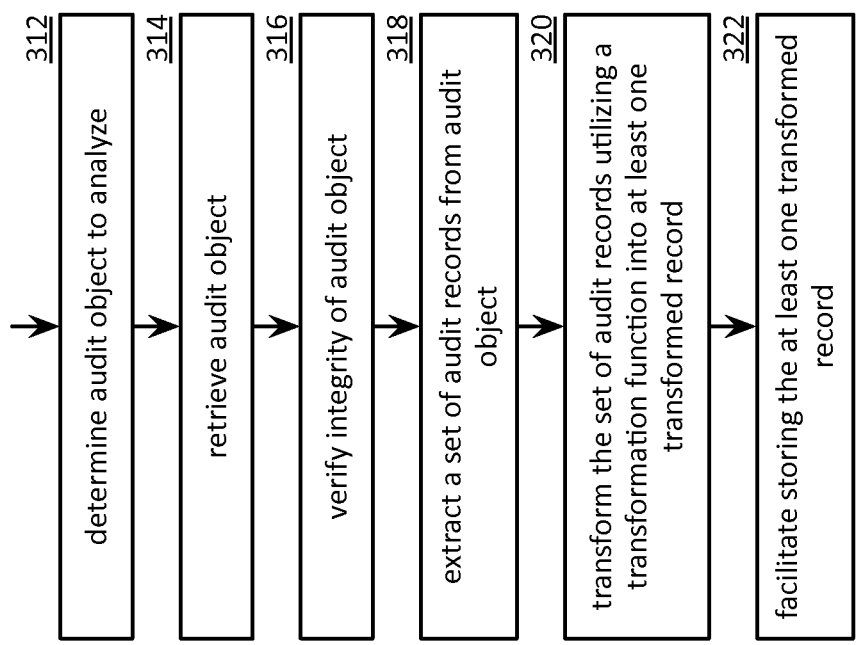
FIG. 14 is a flowchart illustrating an example of transforming an audit record in accordance with the present invention.

FIG. 14 is a flowchart illustrating an example of transforming an audit record. The method begins at step 312 where a processing module (e.g., a dispersed storage (DS) managing unit) determines an audit object to analyze. The determining may be based on one or more of where an analysis process left off last time, retrieving a next audit object identifier (ID), and receiving a message. The method continues at step 314 where the processing module retrieves an audit object. The retrieving includes one or more of performing a lookup to retrieve a vault ID corresponding to the audit object, retrieving a plurality of encoded audit object slices based on the vault ID, and decoding the plurality of encoded audit object slices to produce the audit object.

The method continues at step 316 where the processing module verifies integrity of the audit object. The verifying includes comparing integrity information extracted from the audit object to calculated integrity information based on a remaining portion of the audit object. The processing module verifies the integrity of the audit object when the comparison is favorable (e.g., substantially the same). The method continues at step 318 where the processing module extracts a set of audit records from the audit object. The method continues at step 320 where the processing module transforms the set of audit records utilizing a transformation function into at least one transformed record. The transformation function includes converting the set of audit records into the at least one transformed record in accordance with at least one of a comma separated values (CSV) file format and a structured query language (SQL) format.

The method continues at step 322 where the processing module facilitates storing the at least one transformed record. The facilitating includes at least one of dispersed storage error encoding the at least one transformed record to produce a plurality of sets of transformed record slices and sending the plurality of sets of transformed record slices to a dispersed storage network (DSN) memory for storage therein, and sending the at least one transformed record to a DS processing unit for storing the at least one transformed record as the plurality of sets of transformed record slices in the DSN memory.

Figures 15A, 15B:
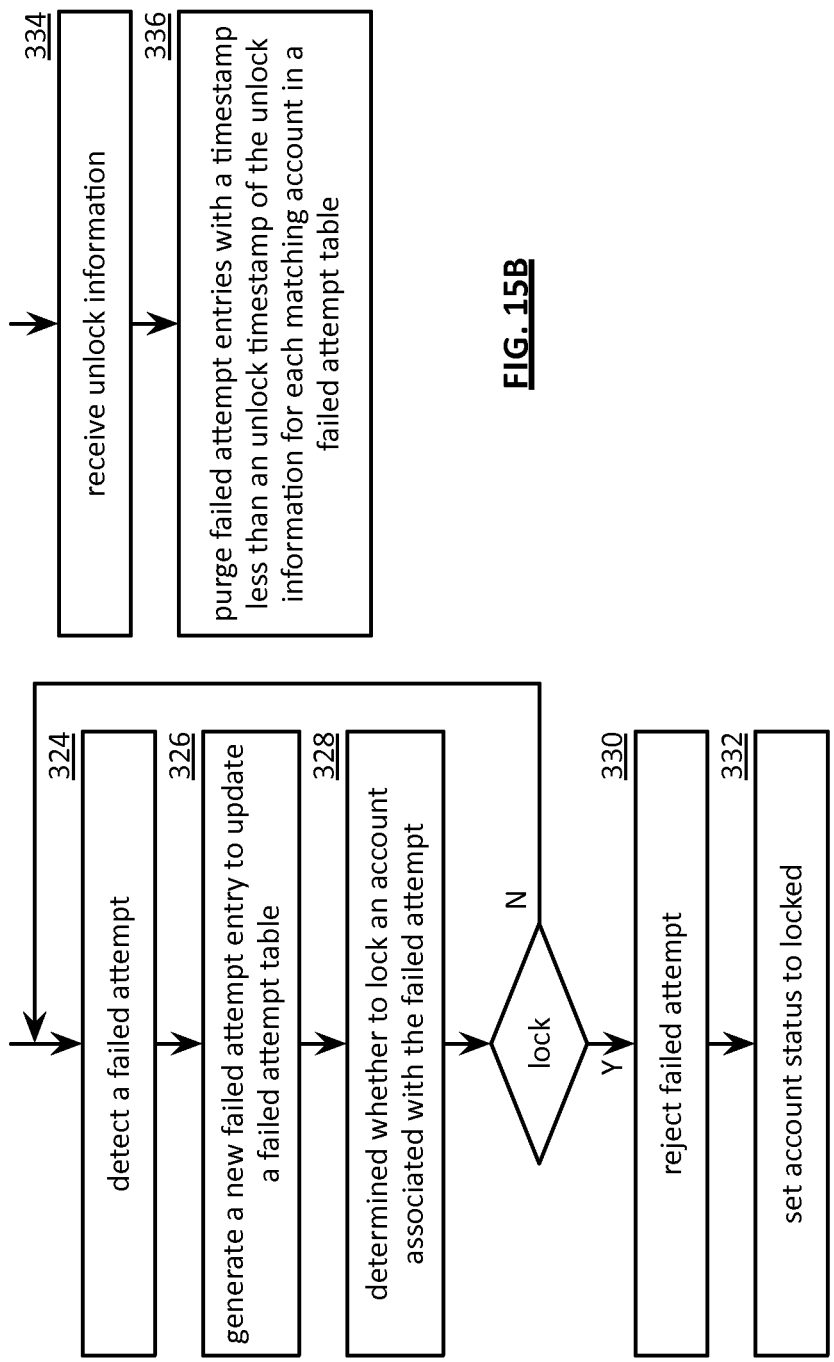
FIG. 15A is a flow chart illustrating an example of locking access in accordance with the present invention.
FIG. 15B is a flowchart illustrating an example of unlocking access in accordance with the present invention.

FIG. 15A is a flow chart illustrating an example of locking access. The method begins at step 324 where a processing module (e.g., of any dispersed storage network (DSN) system entity such as a dispersed storage (DS) unit) detects a failed attempt. The detecting may be based on one or more of determining that a requesting entity of a DSN access request is not authorized to perform an action associated with the access request and determining that an expected challenge response was not received from the requesting entity. The method continues at step 326 where the processing module generates a new failed attempt entry to update a failed attempt table. The failed attempt table includes an account number associated with the requesting entity and a list of timestamp corresponding to previous failed attempts. The new failed attempt entry includes a current timestamp corresponding to the failed attempt.

The method continues at step 328 of the processing module determines whether to lock the account (e.g., of the requesting entity) associated with the failed attempt. The determining may be based on comparing a number of previous failed attempts of the account to a failed attempt threshold. For example, the processing module determines to lock the account when the number of previous failed attempts is greater than the failed attempt threshold. The method loops back to step 324 when the processing module determines not to lock the account. The method continues to step 330 when the processing module determines to lock the account.

The method continues at step 330 where the processing module rejects the failed attempt on the processing module determines to lock the account. The rejecting includes at least one of sending a rejection message to the requesting entity and sending the rejection message to a DS managing unit. The method continues at step 332 where the processing module sets the account status to locked. The setting includes updating an account status table to include a timestamp corresponding to lock in the account, wherein the account status table includes one or more account numbers and a timestamp corresponding to each of the one more account numbers of when the account was locked or unlocked.

FIG. 15B is a flowchart illustrating an example of unlocking access. The method begins at step 334 where a processing module (e.g., of any dispersed storage network (DSN) system entity such as a dispersed storage (DS) unit) receives unlock information (e.g., from a DS managing unit). The unlock information includes an account number and a timestamp corresponding to when the account was unlocked. The method continues at step 336 where the processing module purges failed attempt entries with a timestamp less than an unlock timestamp of the unlock information for each matching account in a failed attempt table. As such, going forward, the system entity stores new failed attempt information in the failed attempt table subsequent to receiving the unlock information.

Figure 16A:
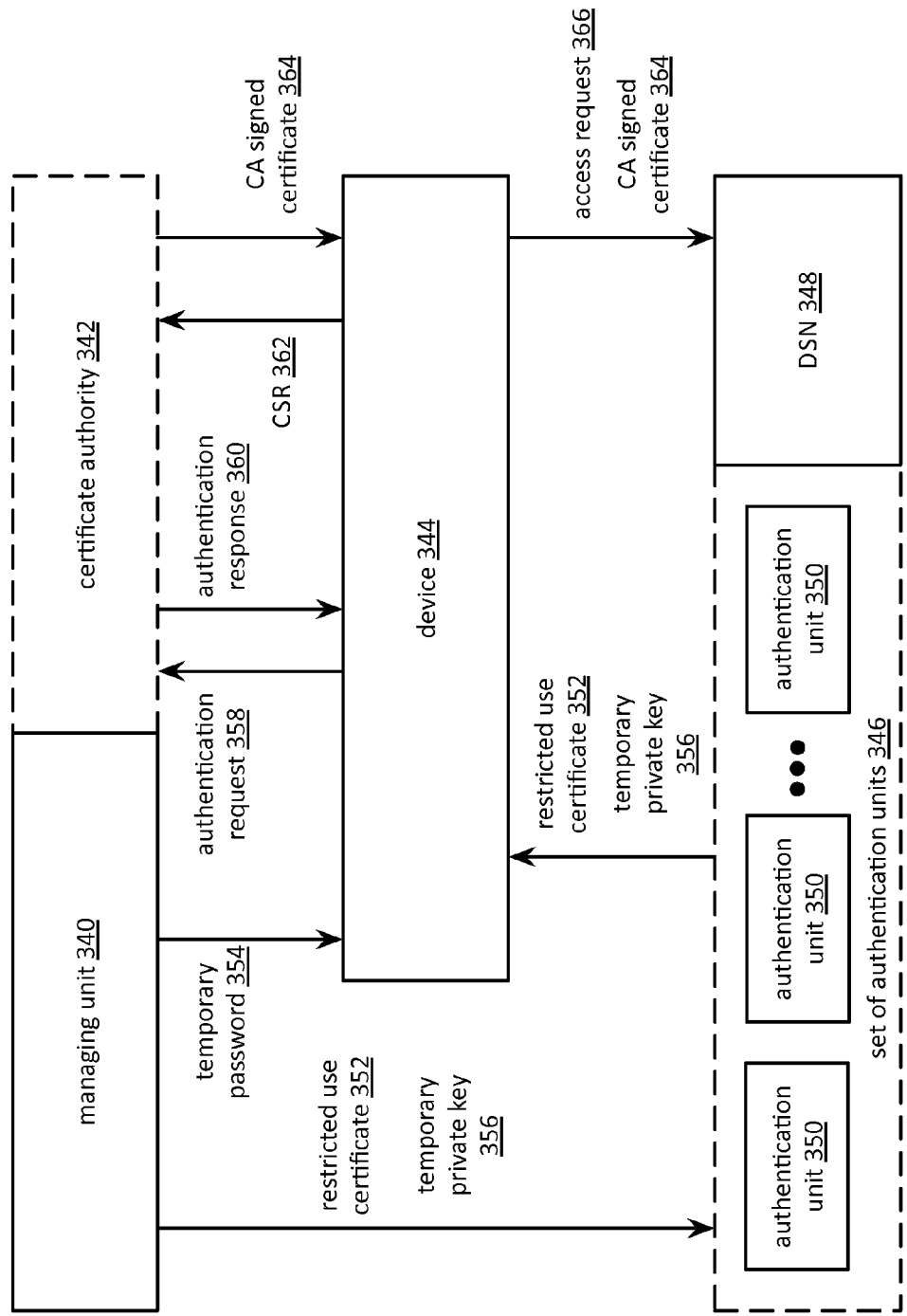
FIG. 16A is a schematic block diagram of an embodiment of an authentication system in accordance with the present invention.

FIG. 16A is a schematic block diagram of an embodiment of an authentication system that includes a managing unit 340, a certificate authority (CA) 342, a device 344, a set of authentication units 346, and a dispersed storage network (DSN) 348. The managing unit 340 may be implemented utilizing at least one of a managing server, the certificate authority 342, a computing device, and a dispersed storage (DS) managing unit. The certificate authority 342 may be implemented utilizing at least one of the managing units 340, a managing server, and DS managing unit. For example, the certificate authority 342 is implemented as part of the managing unit 340. The device 344 includes at least one of a user device, a DS processing unit, a DS unit, a storage integrity processing unit, a server, and a computing device. The set of authentication units 346 includes two or more authentication units 350. An authentication unit 350 may be implemented utilizing at least one of a user device, a DS processing unit, and a DS unit. The DSN 348 includes one or more of a user device, a DS processing unit, a DSN memory, a DS unit, a storage integrity processing unit, a DS managing unit, the managing unit 340, the certificate authority 342, the device 344, and the set of authentication units 346. For example, DSN 348 includes the set of authentication units 346 when the two or more authentication units 350 are implemented utilizing two or more DS units of the DSN 348.

The system functions to facilitate authenticating of device 344 to enable subsequent provisioning of a signed certificate for the device 344 to access the DSN 348. The managing unit 340 functions to generate a temporary public-private key pair for the device 344. For example, the managing unit 340 utilizes a public key infrastructure (PKI) key generation approach to generate the temporary public-private key pair that includes a temporary private key 356 and a temporary public-key. The managing unit 340 generates, for the device 344, a restricted use certificate 352 that includes the temporary public key of the temporary public-private key pair. The restricted use certificate 352 may also include one or more of a subject identifier (ID) of the device 344 and a restriction indicator. The restriction indicator indicates one or more restrictions associated with the restricted use certificate 352. The restrictions include one or more of use once to change the temporary public-private key pair, use once to change the temporary password, can only access managing unit 340 or the certificate authority 342, and a restricted limited time period of use (e.g., next 24 hours).

The managing unit 340 generates a temporary password 354 for the device 344. The generation includes at least one of generating a random alphanumeric string of a predetermined number of characters, retrieving the temporary password from a temporary password list, and receiving the temporary password (e.g., from an add a new user process, from a reset a user password process). The managing unit 340 encodes, in accordance with a distributed authentication protocol and using the temporary password 354, the temporary private key 356 of the temporary public-private key pair to produce a set of encoded private key shares. The managing unit 340 encodes, in accordance with the distributed authentication protocol and using the temporary password 354, the restricted use certificate 352 to produce a set of encoded certificate shares.

The managing unit 340 outputs the set of encoded private key shares as the temporary private key 356 and outputs the set of encoded certificate shares as the restricted use certificate 352 to the set of authentication units 346. Alternatively, or in addition to, the managing unit 340 stores the encoded private key shares and/or the encoded certificate shares in one or more of a token device memory, a local memory, a memory of device 344, and DSN memory of the DSN 348. The managing unit 340 outputs the temporary password 354 to the device 344 such that, when the device 344 retrieves the set of encoded private key shares as the temporary private key 356 and the set of encoded certificate shares as the restricted use certificate 352 from the set of authentication units 346, the device 344 is able to recapture the temporary private key 356 and the restricted use certificate 352 to obtain a signed certificate for accessing the DSN 348. The outputting of the temporary password 354 includes at least one of electronically transferring the temporary password 354 to the device 344, displaying the temporary password 354 on a user output associated with the managing unit 340, and storing the temporary password 354 in a memory accessible by the device 344 (e.g., a memory stick).

The device 344 obtains the temporary password 354 associated with the temporary public-private key pair. The obtaining includes at least one of facilitating receiving the temporary password 354 from a user input associated with the device 344, initiating a query, retrieving from a memory, and receiving. The device 344 retrieves the set of encoded private key shares as the temporary private key 356 and the set of encoded certificate shares as the restricted use certificate 352 from the set of authentication units 346 based on the temporary password 354.

The device 344 requests authentication with the certificate authority 342 based on the restricted use certificate 352 and the temporary private key 356. The requesting authentication includes generating a certification signature for the restricted use certificate 352 utilizing the temporary private key 356 to produce a signed restricted use certificate, generating an authentication request 358 that includes the signed restricted use certificate, outputting the authentication request 358 to the certificate authority 342, and receiving an authentication response 360 that includes an authentication response. The authentication response includes at least one of an authentication confirmation or an authentication denial.

When authenticated by the certificate authority 342, the device 344 generates a public-private key pair (e.g., a new key pair to replace the temporary public-private key pair). The device 344 generates a certificate signing request (CSR) 362 that includes at least one of a public key of the public-private key pair and a certification signature of the CSR utilizing a private key of the public-private key pair. The device 344 outputs the CSR 362 to the certificate authority 342. The certificate authority 342 authenticates the CSR 362 utilizing the public-key of the public-private key pair. When authenticated, the certificate authority 342 generates a certificate authority signed certificate 364. The device 344 receives, from the certificate authority, the CA signed certificate 364. The device 344 generates an access request 366 using the CA signed certificate 364 to access the DSN.

Figure 16B:
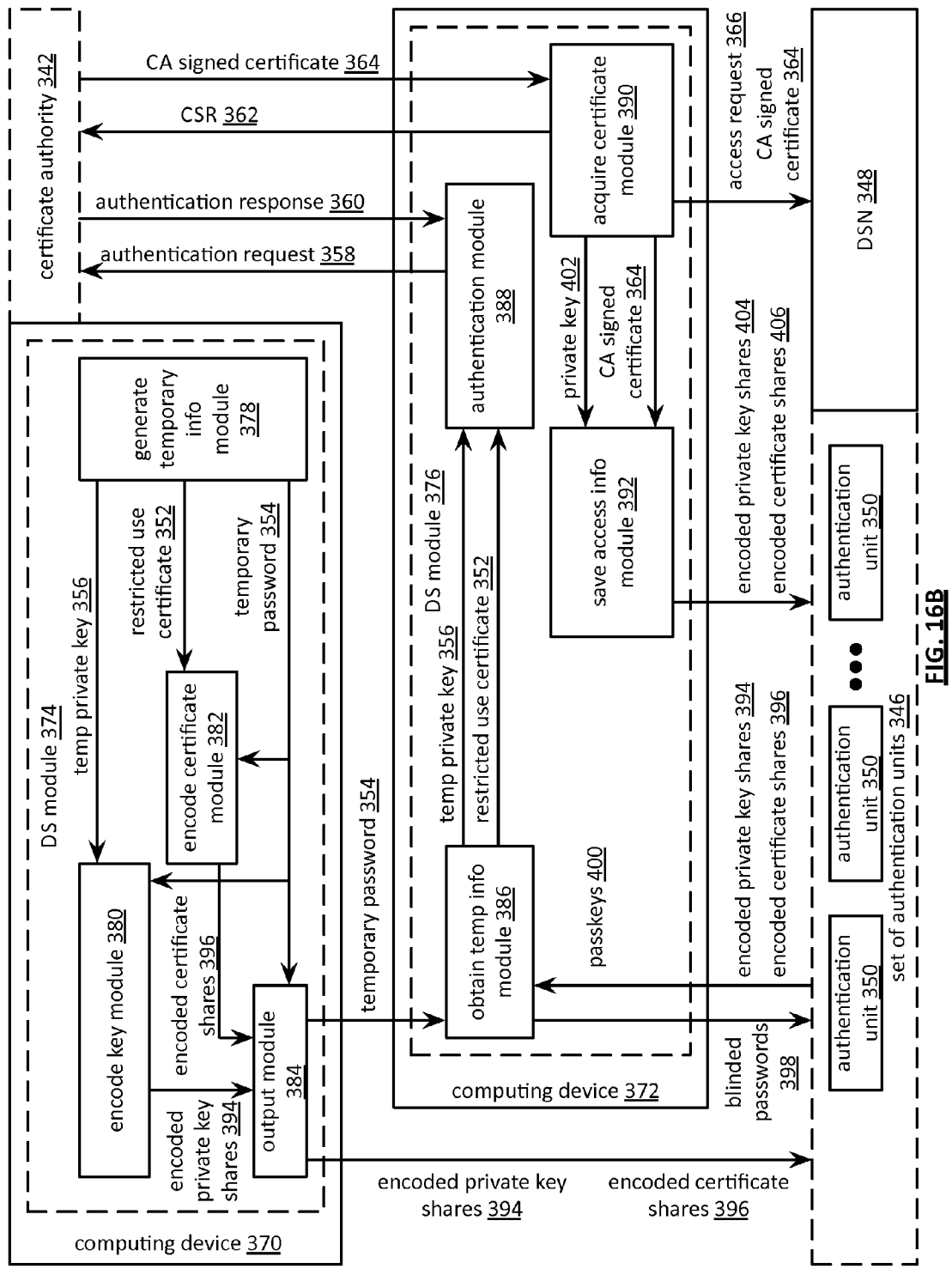
FIG. 16B is a schematic block diagram of another embodiment of an authentication system in accordance with the present invention.

FIG. 16B is a schematic block diagram of another embodiment of an authentication system that includes computing devices 370-372, a certificate authority 342, a set of authentication units 346, and a DSN 348. The set of authentication units 346 includes two or more authentication units 350. The computing device 370 may be utilized to implement a managing unit (e.g., a dispersed storage (DS) managing unit) and computing device 372 may be utilized to implement a device (e.g., a user device, a DS processing unit, etc.). The computing device 370 includes a DS module 374 and computing device 372 includes a DS module 376. The DS module 374 includes a generate temporary information module 378, an encode key module 380, an encode certificate module 382, and an output module 384. The DS module 376 includes an obtain temporary information module 386, an authentication module 388, an acquire certificate module 390, and a save access information module 392.

The generate temporary information module 378 generates a temporary public-private key pair for computing device 372. The generate temporary information module 378 may generate the temporary public-private key pair utilizing a public key infrastructure (PKI) approach such that the public-private key pair includes a temporary public key and a temporary private key 356. The generate temporary information module 378 generates, for the computing device 372, a restricted use certificate 352 that includes the temporary public key of the temporary public-private key pair. The generate temporary information module 378 generates the restricted use certificate 352 by generating the restricted use certificate 352 to include the temporary public key of the temporary public-private key pair and at least one of, a subject identifier (ID) field value that includes an authenticating device ID, a number of uses field value (e.g., 1), a time validity indicator (e.g., 1 day), an issuer universally unique identifier (UUID) (e.g., of computing device 370, of the certificate authority 342), an algorithm ID, an issuer name (e.g., of computing device 370, of the certificate authority 342), and a public key algorithm.

The generate temporary information module 378 generates a temporary password 354 for the computing device 372. The generating includes at least one of generating a random alphanumeric string of a predetermined number of characters, retrieving the temporary password 354 from a temporary password list, and receiving the temporary password 354 (e.g., from an add a new user process, from a reset a user password process).

The encode key module 380 encodes, in accordance with a distributed authentication protocol and using the temporary password 354, the temporary private key 356 and of the temporary public-private key pair to produce a set of encoded private key shares 394. The encode key module 380 encodes the temporary private key 356 utilizing a series of steps. In a first step, the encode key module 380 applies a share encoding function on the temporary private key 356 to produce a set of encoded shares. In a second step, the encode key module 380 generates a set of random numbers. In a third step, the encode key module 380 generates a set of hidden passwords based on the temporary password 354. In a fourth step, for each encoded share of the set of encoded shares, the encode key module 380 generates an encryption key based on a corresponding one of the set of hidden passwords and a corresponding one of the set of random numbers and encrypts the encoded share utilizing the encryption key to produce an encrypted share. In a fifth step, the encode key module 380 groups the set of random numbers and a set of the encrypted shares to produce the set of encoded private key shares 394.

The encode certificate module 382 encodes, in accordance with the distributed authentication protocol and using the temporary password 354, the restricted use certificate to produce a set of encoded certificate shares 396. The encode certificate module 382 encodes the restricted use certificate 352 utilizing a series of steps. In a first step, the encode certificate module 382 applies the share encoding function on the restricted use certificate to produce a set of encoded shares. In a second step, the encode certificate module 382 generates a set of random numbers (e.g., or utilizes the random numbers utilized in association with the encoding of the set of encoded private key shares 394). In a third step, the encode certificate module 382 generates a set of hidden passwords (e.g., or utilizes the hidden passwords utilized in association with the encoding of the set of encoded private key shares 394) based on the temporary password 354. In a fourth step, for each encoded share of the set of encoded shares, the encode certificate module 382 generates an encryption key (e.g., or utilizes a corresponding encryption key utilized in association with the encoding of the set of encoded private key shares 394) based on a corresponding one of the set of hidden passwords and a corresponding one of the set of random numbers and encrypts the encoded share utilizing the encryption key to produce an encrypted share. In a fifth step, the encode certificate module 382 groups the set of random numbers and a set of the encrypted shares to produce the set of encoded certificate shares.

The output module 384 outputs the set of encoded private key shares 394 and the set of encoded certificate shares 396 to the set of authentication units 346. Alternatively, or in addition to, the output module 384 stores the encoded private key shares 394 and/or the encoded certificate shares 396 in one or more of a token device memory, a local memory, a memory of computing device 372, and DSN memory of the DSN 348. The output module 384 outputs the temporary password 354 to the computing device 372 such that, when the computing device 372 retrieves the set of encoded private key shares 394 and the set of encoded certificate shares 396 from the set of authentication units 346, the computing device 372 is able to recapture the temporary private key 356 and the restricted use certificate 352 to obtain a signed certificate for accessing the DSN 348.

With regards to accessing the DSN 348 by the computing device 372, the obtain temporary information module 386 obtains the temporary password 354 associated with the temporary public-private key pair. The obtaining includes at least one of facilitating receiving the temporary password 354 from a user input associated with the computing device 372, initiating a query, retrieving from a memory, and receiving from computing device 370. The obtain temporary information module 386 retrieves the set of encoded private key shares 394 and the set of encoded certificate shares 396 from the set of authentication units 346 based on the temporary password 354.

The obtain temporary information module 386 retrieves the set of encoded private key shares 394 utilizing a series of steps. In a first step, the obtain temporary information module 386 regenerates the set of hidden passwords based on the temporary password 354. In a second step, the obtain temporary information module 386 generates a set of blinded passwords 398 based on the set of hidden passwords and a set of blinded random numbers. The obtain temporary information module 386 generates the set of blinded random numbers by obtaining a set of base random numbers and expanding each base random number of the set of base random numbers based on security parameters to produce the set of blinded random numbers. In a third step, the obtain temporary information module 386 outputs the set of blinded passwords 398 to the set of authentication units 346. In a fourth step, the obtain temporary information module 386 receives a set of passkeys 400 from the set of authentication units 346. Each authentication unit 350 of the set of authentication units 346 generates a passkey of the set of passkeys 400 based on a corresponding blinded password of the set of blinded passwords 398 and a recovered random number of a set of recovered random numbers (e.g., retrieved from a memory of the authentication unit 350). In a fifth step, the obtain temporary information module 386 generates a set of decryption keys based on the set of blinded random numbers and the set of passkeys 400. In a sixth step, the obtain temporary information module 386 retrieves the set of encrypted shares, previously stored as the set of encoded private key shares 394, from the set of authentication units 346. In a seventh step, the obtain temporary information module 386 decrypts the set of encrypted shares utilizing the set of decryption keys to produce a set of shares. In an eight step, the obtain temporary information module 386 decodes the set of shares to reproduce the temporary private key 356.

The obtain temporary information module 386 retrieves the set of encoded certificate shares utilizing a series of steps. In a first step, the obtain temporary information module 386 regenerates the set of hidden passwords based on the temporary password 354. Alternatively, the obtain temporary information module 386 utilizes the set of hidden passwords generated with regards to retrieving the set of encoded private key shares 394. In a second step, the obtain temporary information module 386 generates a set of blinded passwords 398 based on the set of hidden passwords and the set of blinded random numbers. Alternatively, the obtain temporary information module 386 utilizes the set of blinded passwords 398 generated with regards to retrieving the set of encoded private key shares 394. In a third step, the obtain temporary information module 386 outputs the set of blinded passwords 398 to the set of authentication units 346. In a fourth step, the obtain temporary information module 386 receives a set of passkeys 400 from the set of authentication units 346. Alternatively, the obtain temporary information module 386 utilizes the set of passkeys 400 received with regards to retrieving the set of encoded private key shares 394. Each authentication unit 350 of the set of authentication units 346 generates a passkey of the set of passkeys 400 based on a corresponding blinded password of the set of blinded passwords 398 and a recovered random number of a set of recovered random numbers (e.g., retrieved from a memory of the authentication unit 350).

In a fifth step of retrieving the set of encoded certificate shares, the obtain temporary information module 386 generates a set of decryption keys based on the set of blinded random numbers and the set of passkeys 400. Alternatively, the obtain temporary information module 386 utilizes the set of decryption keys generated with regards to retrieving the set of encoded private key shares 394. In a sixth step, the obtain temporary information module 386 retrieves the set of encrypted shares, previously stored as the set of encoded certificate shares 396, from the set of authentication units 346. In a seventh step, the obtain temporary information module 386 decrypts the set of encrypted shares utilizing the set of decryption keys to produce a set of shares. In an eight step, the obtain temporary information module 386 decodes the set of shares to reproduce the restricted use certificate 352.

The authentication module 388 requests authentication with the certificate authority 342 based on the restricted use certificate 352 and the temporary private key 356. The authentication module 388 requests authentication with the certificate authority 342 by generating a certification signature of the restricted use certificate 352 utilizing the temporary private key 356 to produce a signed restricted use certificate, generating an authentication request 358 that includes the signed restricted use certificate, outputting the authentication request 358 (e.g., that includes the signed restricted use certificate) to the certificate authority 342, and receiving an authentication response 360 from the certificate authority 342 that includes an authentication confirmation (e.g., indicating whether the computing device 372 is authenticated).

When authenticated by the certificate authority, the acquire certificate module 390 generates a public-private key pair (e.g., new keys). The acquire certificate module 390 outputs a certificate signing request (CSR) 362 to the certificate authority 342. The CSR 362 includes a certificate, which in turn, includes a public key of the public-private key pair. The acquire certificate module 390 receives, from the certificate authority, a CA signed certificate 364 of the certificate. The acquire certificate module 390 is further operable to generate a request to access 366 the DSN 348 utilizing the CA signed certificate 364.

The save access information module 392 generates a device password for the computing device 372 (e.g., a new password). The save access information module 392 encodes, in accordance with the distributed authentication protocol and using the device password, a private key 402 of the public-private key pair to produce a set of encoded private key shares 404. The save access information module 392 encodes, in accordance with the distributed authentication protocol and using the password, the CA signed certificate 364 to produce a set of encoded certificate shares 406. The save access information module 392 outputs the set of encoded private key shares 404 and the set of encoded certificate shares 406 to the set of authentication units 346 for storage therein.

Figure 16C:
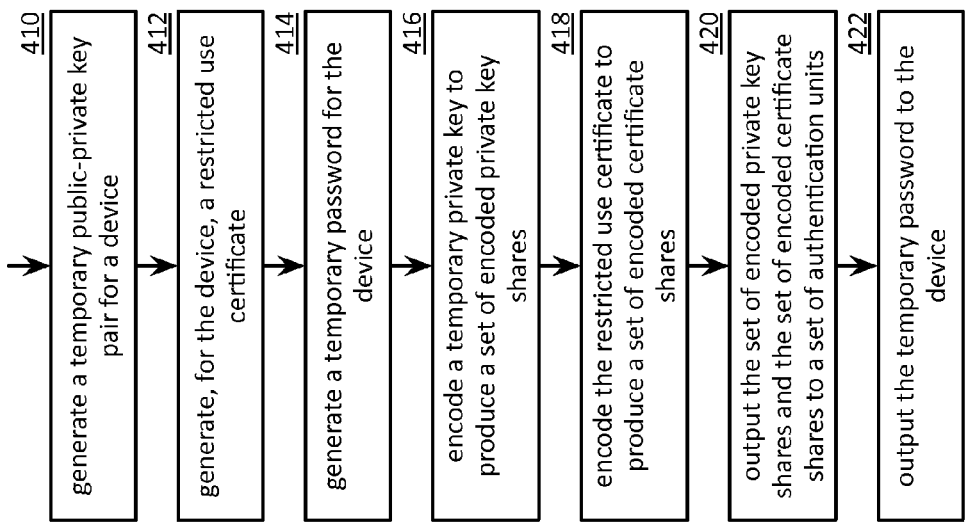
FIG. 16C is a flow chart illustrating an example of generating temporary access rights in accordance with the present invention.

FIG. 16C is a flow chart illustrating an example of generating temporary access rights. The method begins at step 410 where a processing module (e.g., of a managing unit) generates a temporary public-private key pair for a device. The method continues at step 412 where the processing module generates, for the device, a restricted use certificate that includes a temporary public key of the temporary public-private key pair. The generating the restricted use certificate includes generating the restricted use certificate to include the temporary public key of the temporary public-private key pair and at least one of a subject identifier (ID) field value that includes an authenticating device ID, a number of uses field value, a time validity indicator, an issuer universally unique identifier (UUID), an algorithm ID, an issuer name, and public key algorithm.

The method continues at step 414 where the processing module generates a temporary password for the device. The generation includes at least one of generating a random alphanumeric string of a predetermined number of characters, retrieving the temporary password from a temporary password list, and receiving the temporary password (e.g., from an add a new user process, from a reset a user password process).

The method continues at step 416 where the processing module encodes, in accordance with a distributed authentication protocol and using the temporary password, a temporary private key of the temporary public-private key pair to produce a set of encoded private key shares. The encoding the temporary private key in accordance with the distributed authentication protocol includes a sequence of several steps. In a first step, the processing module applies a share encoding function on the temporary private key to produce a set of encoded shares. The share encoding function includes at least one of a dispersed storage error encoding function and a secret sharing function (e.g., a Shamir secret sharing algorithm). In a second step, the processing module generates a set of random numbers. For example, the processing module generates each random number of the set of random numbers to have a same number of bits as a number of bits of p, where p is determined by security parameters (e.g., of dispersed storage error coding parameters).

In a third step of encoding the temporary private key, the processing module generates a set of hidden passwords based on the temporary password. The generating of the set of hidden passwords includes transforming the temporary password in accordance with a set of transformation functions to produce a set of transformed authenticating values and for each password of the corresponding set of hidden passwords, combining, in accordance with a combining function, one of the set of transformed authenticating values with at least one of a constant and another one of the set of transformed authenticating values to produce the password. The transformation function includes at least one of a null function, a concatenation function, an inverting function, a hashing function, an encryption function, a compressing function, and a mask generating function. The combining function includes at least one of an addition function, a subtraction function, a multiplication function, a division function, a logical exclusive OR function, a logical OR function, and a logical AND function. In an instance, each hidden password is unique from all the other hidden passwords. In another instance, each hidden password is substantially the same as all the other hidden passwords.

In a fourth step of encoding the temporary private key, for each encoded share of the set of encoded shares, the processing module generates an encryption key based on a corresponding one of the set of hidden passwords and a corresponding one of the set of random numbers and encrypts the encoded share utilizing the encryption key to produce an encrypted share. The encryption key includes a same number of bits as a number of bits of p. For example, the processing module generates the encryption key by transforming an expansion of the corresponding one of the set of hidden passwords utilizing a mask generating function (MGF) and the corresponding one of the set of random numbers in accordance with the expression: key x=((MGF (hidden password))$^2)^{e_x}$ modulo p, where $e_x$ is the corresponding one random number. In a fifth step of encoding the temporary private key, the processing module groups the set of random numbers and a set of the encrypted shares to produce the set of encoded private key shares.

The method continues at step 418 where the processing module encodes, in accordance with the distributed authentication protocol and using the temporary password, the restricted use certificate to produce a set of encoded certificate shares. The encoding the restricted use certificate in accordance with the distributed authentication protocol includes another sequence of several steps. In a first step, the processing module applies the share encoding function on the restricted use certificate to produce another set of encoded shares. Alternatively, the processing module encodes the temporary private key and the restricted use certificate substantially simultaneously. For example, the processing module combines the temporary private key and the restricted use certificate and applies the share encoding function on the combination to produce the set of encoded shares. In a second step, the processing module generates another set of random numbers. Alternatively, the processing module utilizes the set of random numbers.

In a third step of encoding the restricted use certificate, the processing module generates another set of hidden passwords based on the temporary password. The generating of the other set of hidden passwords includes transforming the temporary password in accordance with the set of transformation functions to produce another set of transformed authenticating values and for each password of the corresponding other set of hidden passwords, combining, in accordance with the combining function, one of the other set of transformed authenticating values with at least one of a constant and another one of the other set of transformed authenticating values to produce the other hidden password. In an instance, each other hidden password is unique from all the hidden passwords of the other set of hidden passwords and the set of hidden passwords. In another instance, each other hidden password is substantially the same as all the other hidden passwords of the other set of hidden passwords and the set of hidden passwords.

In a fourth step of encoding the restricted use certificate, for each other encoded share of the other set of encoded shares, the processing module generates another encryption key based on a corresponding one of the other set of hidden passwords and a corresponding one of the other set of random numbers and encrypts the other encoded share utilizing the other encryption key to produce another encrypted share. The other encryption key includes a same number of bits as a number of bits of p. In a fifth step of encoding the restricted use certificate, the processing module groups the other set of random numbers and another set of the other encrypted shares to produce the set of encoded certificate shares.

The method continues at step 420 with the processing module outputs the set of encoded private key shares and the set of encoded certificate shares to a set of authentication units. The method continues at step 422 where the processing module outputs the temporary password to the device such that, when the device retrieves the set of encoded private key shares and the set of encoded certificate shares from the set of authentication units, the device is able to recapture the temporary private key and the restricted use certificate to obtain a signed certificate for accessing a distributed storage network (DSN).

FIG. 16D is a flowchart illustrating an example of acquiring access credentials. The method begins at step 424 or a processing module (e.g., of a device) obtains a temporary password associated with a temporary public-private key pair. The obtaining includes at least one of retrieving from a memory, receiving from a managing unit, receiving from a user interface input. The method continues at step 426 where the processing module retrieves a set of encoded private key shares and a set of encoded certificate shares from a set of authentication units based on the temporary password. The temporary private key of the temporary public-private key pair is encoded using a distributed authentication protocol and the temporary password to produce the set of encoded private key shares and a restricted use certificate is encoded using the distributed authentication protocol and the temporary password to produce the set of encoded certificate shares.

The retrieving the set of encoded private key shares includes a sequence of several steps. In a first step, the processing module generates a set of hidden passwords based on the temporary password. In a second step, the processing module generates a set of blinded passwords based on the set of hidden passwords and a set of blinded random numbers. The set of blinded passwords are generated such that each blinded password includes a same number of bits as a number of bits of a security parameter p. For example, the processing module generates the set of blinded passwords by transforming an expansion of each hidden password of the set of hidden password into the same number of bits as the security parameter constant p utilizing a mask generating function (MGF) and a corresponding one of the set of blinded random numbers in accordance with the expression blinded password x=((MGF(hidden password x))$^2)^{b_x}$ modulo p, where $b_x$ is a blinded random number x.

In a third step of retrieving the set of encoded private key shares, the processing module outputs the set of blinded passwords to the set of authentication units in the fourth step, the processing module receives a set of passkeys from the set of authentication units. Each authentication unit of the set of authentication units generates a passkey of the set of passkeys based on a corresponding blinded password of the set of blinded passwords and a recovered random number of a set of recovered random numbers. For example, an authentication unit of the set of authentication units generates the passkey of the set of passkeys based on the corresponding blinded password of the set of blinded passwords and the recovered random number of the set of recovered random numbers in accordance with an passkey x=(blinded password x)$^{e}_{x}$ modulo p, where $e_x$ is the corresponding recovered random number.

In a fourth step of retrieving the set of encoded private key shares, the processing module generates a set of decryption keys based on the set of blinded random numbers and the set of passkeys. The generating includes generating a set of values based on the set of blinded random numbers and generating the set of decryption keys based on the set of values and the set of passkeys. The generating the set of values includes transforming the set of blinded random numbers utilizing a modulo function based on security parameters to produce the set of values. The generating the set of decryption keys based on the set of values and the set of passkeys includes, for each passkey of the set of passkeys, transforming the passkey utilizing a modulo function based on security parameters and a corresponding value of the set of values to produce a decryption key of the set of decryption keys.

In a fifth step of retrieving the set of encoded private key shares, the processing module retrieves a set of encrypted shares from the set of authentication units. For example, the processing module identifies the set of encrypted shares, generates a set of encrypted share requests that includes identity of the set of encrypted shares, outputs the set of encrypted share requests to the set of authenticating units, and receives the set of encrypted shares from the set of authentication units. In a sixth step, the processing module decrypts the set of encrypted shares utilizing the set of decryption keys to produce a set of shares. In a seven step, the processing module decodes the set of shares to reproduce the temporary private key.

The retrieving the set of encoded certificate shares includes another sequence of steps. In a first step, processing module generates another set of hidden passwords based on the temporary password. Alternatively, processing module utilizes the set of hidden passwords. In a second step, the processing module generates another set of blinded passwords based on the other set of hidden passwords and another set of blinded random numbers. Alternatively, the processing module utilizes the set of blinded passwords.

In a third step of retrieving the set of encoded certificate shares, the processing module outputs the other set of blinded passwords to the set of authentication units. In a fourth step, the processing module receives another set of passkeys from the set of authentication units. In a fourth step, the processing module generates another set of decryption keys based on the other set of blinded random numbers and the other set of passkeys. Alternatively, the processing module utilizes the set of decryption keys. The generating includes generating another set of values based on the other set of blinded random numbers and generating the other set of decryption keys based on the other set of values and the other set of passkeys. The generating the other set of values includes transforming the other set of blinded random numbers utilizing a modulo function based on the security parameters to produce the other set of values. The generating the other set of decryption keys based on the other set of values and the other set of passkeys includes, for each passkey of the other set of passkeys, transforming the passkey utilizing a modulo function based on the security parameters and a corresponding value of the other set of values to produce a decryption key of the other set of decryption keys.

In a fifth step of retrieving the set of encoded certificate shares, the processing module retrieves another set of encrypted shares from the set of authentication units. For example, the processing module identifies the other set of encrypted shares, generates another set of encrypted share requests that includes identity of the other set of encrypted shares, outputs the other set of encrypted share requests to the set of authenticating units, and receives the other set of encrypted shares from the set of authentication units. In a sixth step, the processing module decrypts the other set of encrypted shares utilizing the other set of decryption keys to produce another set of shares. In a seven step, the processing module decodes the other set of shares to reproduce restricted use certificate.

The method continues at step 428 where the processing module requests authentication with a certificate authority based on the restricted use certificate and the temporary private key. The requesting authentication with the certificate authority includes generating a certification signature of the restricted use certificate utilizing the temporary private key to produce a signed restricted use certificate, outputting the signed restricted use certificate to the certificate authority, and receiving an authentication confirmation from the certificate authority. When authenticated by the certificate authority, the method continues at step 430 where the processing module generates a public-private key pair (e.g., new keys). The method continues at step 432 where the processing module outputs a certificate signing request (CSR) to the certificate authority (CA), wherein the CSR includes a certificate, which in turn, includes a public key of the public-private key pair. The method continues at step 434 where the processing module receives, from the certificate authority, a CA signed certificate of the certificate. The method continues at step 436 where the processing module generates a request to access a dispersed storage network (DSN) utilizing the CA signed certificate.

The method continues at step 438 where the processing module generates a device password for the device (e.g., a new password). The method continues at step 440 where the processing module encodes, in accordance with the distributed authentication protocol and using the device password, a private key of the public-private key pair to produce a set of encoded private key shares. The method continues at step 442 where the processing module encodes, in accordance with the distributed authentication protocol and using the temporary password, the CA signed certificate to produce a set of encoded certificate shares. The method continues at step 444 where the processing module outputs the set of encoded private key shares and the set of encoded certificate shares to the set of authentication units for storage therein.

Figure 17A:
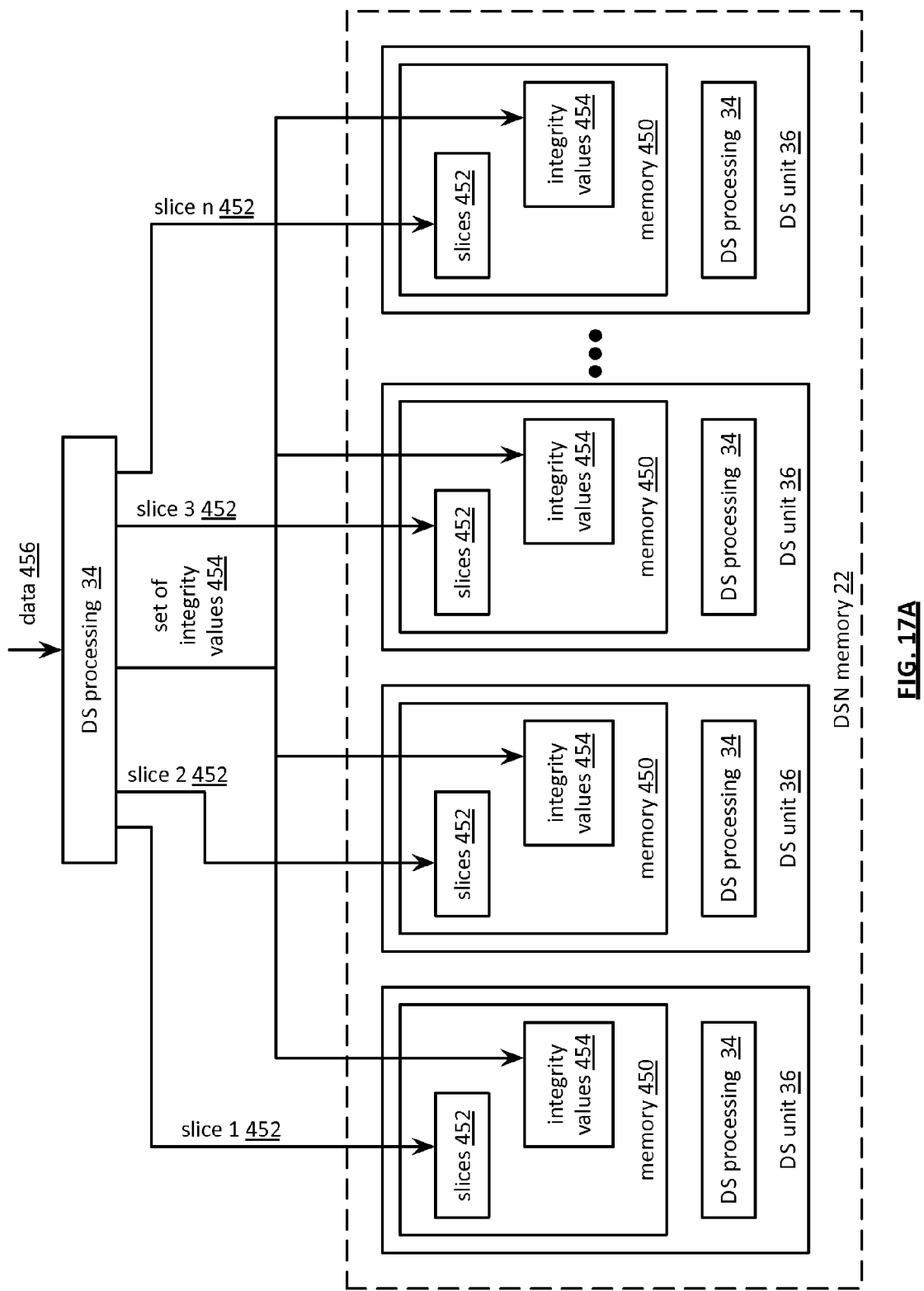
FIG. 17A is a schematic block diagram of another embodiment of a computing system in accordance with the present invention.

FIG. 17A is a schematic block diagram of another embodiment of a computing system that includes a dispersed storage (DS) processing 34 and a dispersed storage network (DSN) memory 22. The DSN memory 22 includes a plurality of DS units 36. Each DS unit 36 of the plurality of DS units 36 includes a DS processing 34 and a memory 450. The memory 450 may be utilized to store slices 452 and integrity values 454. In an example of operation, data 456 is received by the DS processing 34. The DS processing 34 encodes a portion of the data 456 utilizing a dispersed storage error coding function to produce at least one set of encoded data slices 452. The utilization of the dispersed storage error coding function includes utilizing a pillar width parameter n and a decode threshold parameter. The at least one set of encoded data slices 452 includes a pillar width number n of encoded data slices (e.g., slices 1-$n$). Next, the DS processing 34 outputs the at least one set of slices 452 to a corresponding set of DS units 36 of the plurality of DS units 36. The outputting includes identifying the set of DS units 36 based on at least one of a storage set list, a predetermination, and a DS unit performance level.

The DS processing 34 generates a set of integrity values 454 corresponding to the at least one set of encoded data slices 452. The generating includes applying a deterministic function to a corresponding encoded data slice of the at least one set of encoded data slices 452 to produce a corresponding integrity value of the set of integrity values 454. The deterministic function includes at least one of a hashing function, a cyclic redundancy check (CRC) function, a hash-based message authentication code (HMC) function, and a masked generating function (MGF). The set of integrity values 454 includes an integrity value for each encoded data slice of the at least one set of encoded data slices 452. For example, the set of integrity values 454 includes an integrity value for each encoded data slice of a set of encoded data slices 1-16 when the pillar width is 16 and the set of encoded data slices 452 includes 16 encoded data slices.

The DS processing 34 outputs the set of integrity values 454 to each DS unit 36 of the set of DS units 36. For each DS unit 36 of the set of DS units 36, a DS unit receives an encoded data slice of the at least one set of encoded data slices 452 and stores the encoded data slice in memory 450 associated with the DS unit. The DS unit receives the set of integrity values 454 and stores the set of integrity values 454 in the memory 450. As such, each DS unit 36 of the set of DS units 36 stores the set of integrity values 454 pertaining a corresponding encoded data slice stored in the DS unit and to other encoded data slices of the at least one set of encoded data slice 452. The DS unit may subsequently utilize an integrity value of the set of integrity values stored in memory 450 that pertains to the corresponding encoded data slice and retrieve an integrity value from other DS units of the set of DS units 36 that pertains to the corresponding encoded data slice to validate the corresponding encoded data slice. The validation method is discussed in greater detail with reference to FIG. 17B-C.

Figure 17B:
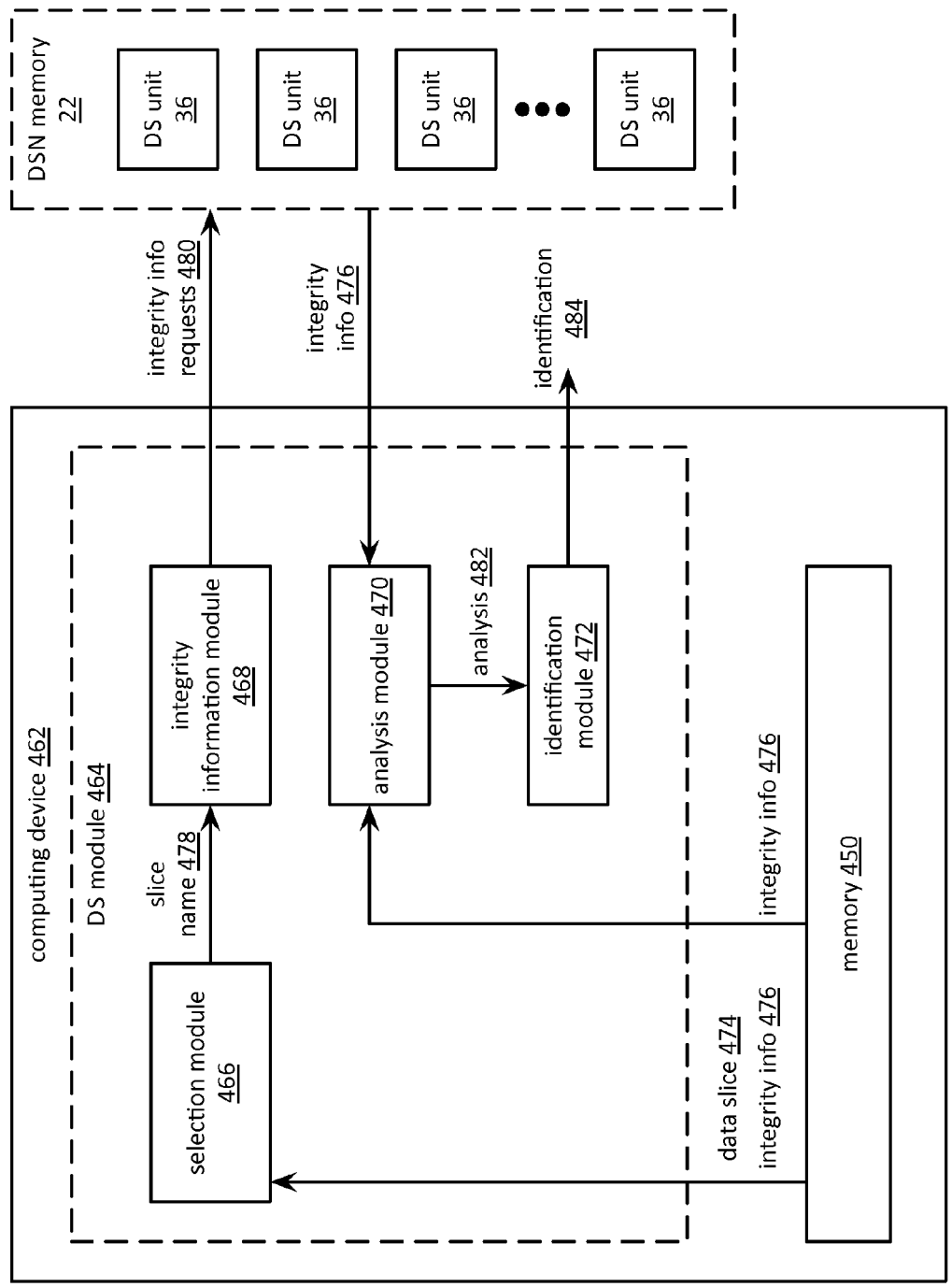
FIG. 17B is a schematic block diagram of another embodiment of a computing system in accordance with the present invention.

FIG. 17B is a schematic block diagram of another embodiment of a computing system that includes a computing device 462 and a dispersed storage network (DSN) memory 22. The DSN memory 22 includes a plurality of dispersed storage (DS) units 36. The computing device 462 may be implemented as at least one of a DS unit, a DS processing unit, and a user device. The computing device 462 includes a DS module 464 and a memory 450. The DS module 464 includes a selection module 466, an integrity information module 468, an analysis module 470, and an identification module 472.

When operable, the system functions to detect intentional corruption of a data slice 474 stored in the memory 450. The intentional corruption of the data slice 474 may accompany a corresponding intentional corruption of local integrity information 476 associated with the data slice 474. The system may become operable for a variety of reasons including one or more of when detecting an unauthorized changing of the data slice 474 and/or the local integrity information 476 associated with the data slice 474, upon access of the DSN memory 22, and upon rebuilding the data slice 474. The local integrity information 476 includes at least one of integrity information of the data slice that is stored in the memory 450 and integrity information of the data slice that is calculated by the computing device 462. The integrity information 476 of the data slice includes a result of a deterministic function operation on the data slice 474.

The selection module 466 selects the data slice 474 for corruption analysis. For example, the selection module 466 produces a slice name 478 associated with the data slice 474. The selection module 466 selects the data slice 474 by one of a variety of approaches. A first approach includes executing a random selection process. A second approach includes receiving a read request for the data slice 474. A third approach includes determining that calculated integrity information does not match the local integrity information 476 stored in the memory 450. For example, a hash digest is calculated for the data slice 474 stored in the memory 450 compares unfavorably (e.g., unfavorable when not substantially the same) to retrieved local integrity information 476 for the data slice 474 when a format of the local integrity information 476 includes a hash format. A fourth approach includes receiving a rebuild request for the data slice 474. A fifth approach includes receiving an error message regarding the data slice 474 (e.g., at a set of data slices level, at data object level, at file name level, at data slice level).

The integrity information module 468 requests integrity information 476 for the data slice 474 from one or more other DS units 36 of the DSN memory 22. For example, the integrity information module 468 generates one or more integrity information requests 480 that includes the slice name 478 corresponding to the data slice 474. The integrity information module 468 may select the one or more DS units 36 utilizing at least one of a variety of approaches. A first approach includes an arbitrary selection process from a set of DS units 36. The set of DS units 36, including the computing device 462, store a set of data slices that includes the data slice 474. For example, the integrity information module 468 selects identical DS units 36 as DS units 36 utilized to store the set of data slices. A second approach includes a security based selection process from the set of DS units. For example, the integrity information module 468 selects the one or more DS units 36 such that the one or more DS units 36 are associated with a favorable level of security. A third approach includes a decode threshold number based selection process from the set of DS units 36. For example, the integrity information module 468 identifies the decode threshold number (e.g., a lookup) and selects the one or more DS units 36 to include the decode threshold number of DS units 36.

The analysis module 470, when the one or more requested integrity information 476 is received, analyzes the one or more received integrity information 476 and local integrity information 476 of the data slice 474 stored in the memory 450 to produce an analysis 482. The analysis module 470 analyzes by one of verifying concurrency of the one or more received integrity information 476 and the local integrity information 476 (e.g., all match) and verifying that the local integrity information 476 substantially matches a threshold number of the one or more received integrity information 476 (e.g., a majority of the one or more received integrity information matches, each of the one or more received integrity information matches, at least a threshold number of the one or more received integrity information matches).

The identification module 472, when the analysis 482 of the one or more received integrity information 476 and the local integrity information 476 of the data slice 474 is unfavorable, identifies the data slice 474 as being corrupted. For example, the application module 472 produces an identification 484. The identification module 472 may further identify the data slice 474 as being corrupted by initiating a rebuilding process to rebuild the identified data slice. The rebuilding process includes one of a partial rebuilding process in which the identified data slice is rebuilt utilizing a zero information gain approach and a rebuilding process in which a data segment is rebuilt from the set of data slices and the data segment is re-encoded to produce a rebuilt data slice.

Figure 17C:
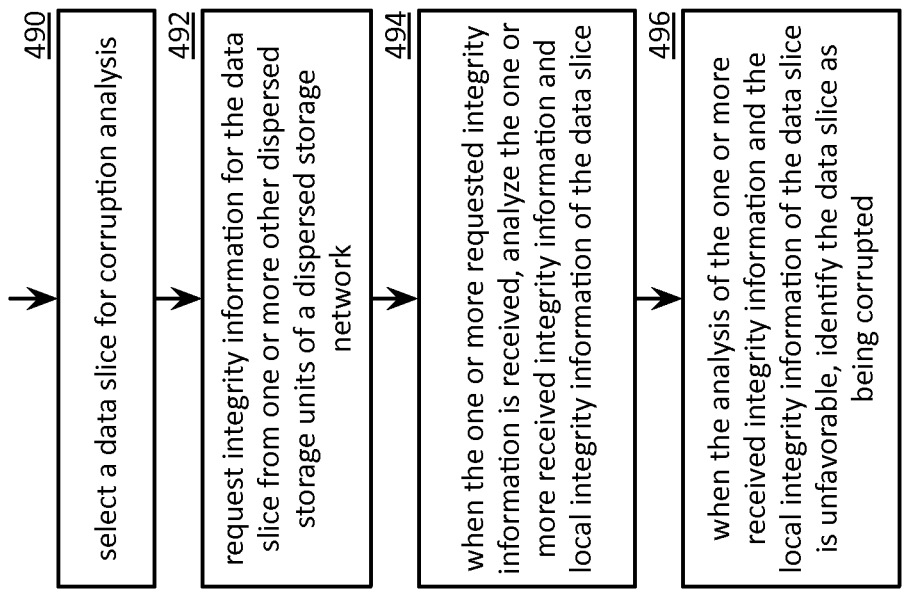
FIG. 17C is a flowchart illustrating an example of detecting intentional corruption of data in accordance with the present invention.

FIG. 17C is a flowchart illustrating an example of detecting intentional corruption of data. The method begins at step 490 where a processing module (e.g., of a dispersed storage (DS) unit of a dispersed storage network (DSN)) selects a data slice for corruption analysis. The selecting the data slice includes one of a variety of approaches. A first approach includes the processing module executing a random selection process. A second approach includes the processing module receiving a read request for the data slice. A third approach includes the processing module determining that calculated integrity information does not match local integrity information stored in the DS unit. A fourth approach includes the processing module receiving a rebuild request for the data slice. A fifth approach includes the processing module receiving an error message regarding the data slice.

The method continues at step 492 where the processing module requests integrity information for the data slice from one or more other DS units of the DSN. The processing module selects the one or more DS units based on at least one of a variety of selection approaches. In a first selection approach, the processing module utilizes an arbitrary selection process from a set of DS units. The set of DS units and the DS unit store a set of data slices that includes the data slice. In a second selection approach, the processing module utilizes a security based selection process from the set of DS units. In a third selection approach, the processing module utilizes a decode threshold number based selection process from the set of DS units.

When the one or more requested integrity information is received, the method continues at step 494 where the processing module analyzes the one or more received integrity information and the local integrity information of the data slice stored in the DS unit. The local integrity information includes at least one of integrity information of the data slice that is stored in the DS unit and integrity information of the data slice that is calculated by the DS unit. The analyzing includes one of verifying concurrency of the one or more received integrity information and the local integrity information and verifying that the local integrity information substantially matches a threshold number of the one or more received integrity information. For example, the processing module produces an analysis that indicates that the one or more received integrity information and the local integrity information is concurrent when the one or more received integrity information and the local integrity information retrieved from a memory of the DS unit substantially matches. As another example, the processing module produces the analysis to indicate that the local integrity information does not substantially match the threshold number of the one or more received integrity information when two of the one or more received integrity information substantially match the local integrity information and the threshold number is three.

When the analysis of the one or more received integrity information and the local integrity information of the data slice is unfavorable, the method continues at step 496 where the processing module identifies the data slice as being corrupted. The identifying the data slice as being corrupted further includes initiating a rebuilding process to rebuild the identified data slice. The rebuilding process includes one of a partial rebuilding process in which the identified data slice is rebuilt and a rebuilding process in which a data segment is rebuilt from a set of data slices and the data segment is re-encoded to produce a rebuild data slice.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by a computing device, the method comprises:
   receiving a certificate signing request (CSR) from a user device regarding a user, wherein the CSR includes user information regarding the user;
   generating a set of hidden passwords based on the user information;
   accessing a set of authenticating units to obtain a set of passkeys based on the set of hidden passwords and a set of random numbers;
   retrieving a set of encrypted shares based on the user information from the set of authenticating units;
   decrypting the set of encrypted shares based on the set of passkeys and the set of random numbers to produce a set of encoded shares;
   decoding, in accordance with a share encoding function, the set of encoded shares to recapture a private key associated with the user;
   generating a user signed certificate based on the private key;
   discarding the private key to substantially protect the private key from the user device; and
   outputting the user signed certificate to the user device.

2. The method of claim 1, wherein accessing the set of authenticating units comprises:
   generating the set of random numbers;
   generating a set of blinded passwords based on the set of hidden passwords and the set of random numbers;
   identifying the set of authenticating units based on the user information;
   outputting the set of blinded passwords to set of identified authenticating units; and
   receiving the set of passkeys from the set of identified authenticating units.

3. The method of claim 1, wherein accessing the set of authenticating units comprises:
   generating the set of random numbers;
   generating a set of blinded passwords based on the set of hidden passwords and the set of random numbers;
   identifying the set of authenticating units based on the user information;
   retrieving a set of recovered random numbers from the set of identified authenticating units; and
   generating the set of passkeys based on the set of blinded passwords and the set of recovered random numbers.

4. The method of claim 1, wherein the decrypting the set of encrypted shares comprises:
   generating a set of encryption keys based on the set of passkeys and the set of random numbers; and
   decrypting the set of encrypted shares utilizing the set of encryption keys to reproduce the set of encoded shares.

5. The method of claim 1, wherein the decoding the set of encoded shares comprises at least one of:
   decoding the set of encoded shares using a secret share function as the share encoding function; and decoding the set of encoded shares using a dispersed storage error encoding function as the share encoding function.

6. The method of claim 1, wherein the generating a user signed certificate comprises:
generating, on behalf of the user, a certification signature based on the private key; and
generating the signed certificate based on a certificate of the CSR and the certification signature such that the user device uses the signed certificate to obtain a certificate authority signed certificate from a certificate authority to access a dispersed storage network.

7. An authentication token comprises:
memory; and
a processing module, wherein the memory stores operational instructions that, when executed by the processing module, causes the processing module to:
receive a certificate signing request (CSR) from a user device regarding a user, wherein the CSR includes user information regarding the user;
generate a set of hidden passwords based on the user information;
access a set of authenticating units to obtain a set of passkeys based on the set of hidden passwords and a set of random numbers;
retrieve, from the memory, a set of encrypted shares based on the user information;
decrypt the set of encrypted shares based on the set of passkeys and the set of random numbers to produce a set of encoded shares;
decode, in accordance with a share encoding function, the set of encoded shares to recapture a private key associated with the user;
generate a user signed certificate based on the private key;
discard the private key to substantially protect the private key from the user device; and
outputting the user signed certificate to the user device.

8. The authentication token of claim 7, wherein the processing module functions to access the set of authenticating units by:
generating the set of random numbers;
generating a set of blinded passwords based on the set of hidden passwords and the set of random numbers;
identifying the set of authenticating units based on the user information;
outputting the set of blinded passwords to set of identified authenticating units; and
receiving the set of passkeys from the set of identified authenticating units.

9. The authentication token of claim 7, wherein the processing module functions to access the set of authenticating units by:
generating the set of random numbers;
generating a set of blinded passwords based on the set of hidden passwords and the set of random numbers;
identifying the set of authenticating units based on the user information;
retrieving a set of recovered random numbers from the set of identified authenticating units; and
generating the set of passkeys based on the set of blinded passwords and the set of recovered random numbers.

10. The authentication token of claim 7, wherein the processing module functions to decrypt the set of encrypted shares by:
generating a set of encryption keys based on the set of passkeys and the set of random numbers; and
decrypting the set of encrypted shares utilizing the set of encryption keys to reproduce the set of encoded shares.

11. The authentication token of claim 7, wherein the processing module functions to decode the set of encoded shares by at least one of:
decoding the set of encoded shares using a secret share function as the share encoding function; and
decoding the set of encoded shares using a dispersed storage error encoding function as the share encoding function.

12. The authentication token of claim 7, wherein the processing module functions to generate a user signed certificate by:
generating, on behalf of the user, a certification signature based on the private key; and
generating the signed certificate based on a certificate of the CSR and the certification signature such that the user device uses the signed certificate to obtain a certificate authority signed certificate from a certificate authority to access a dispersed storage network.

* * * * *